United States Patent
Dvorak

(10) Patent No.: US 12,545,383 B1
(45) Date of Patent: Feb. 10, 2026

(54) PAYLOAD RE-POSITIONING SYSTEM FOR A MARITIME VEHICLE

(71) Applicant: SARONIC TECHNOLOGIES, Austin, TX (US)

(72) Inventor: Joseph Dvorak, Austin, TX (US)

(73) Assignee: SARONIC TECHNOLOGIES, Austin, TX (US)

( * ) Notice: Subject to any disclaimer, the term of this patent is extended or adjusted under 35 U.S.C. 154(b) by 0 days.

(21) Appl. No.: 19/292,619

(22) Filed: Aug. 6, 2025

Related U.S. Application Data

(60) Provisional application No. 63/679,854, filed on Aug. 6, 2024.

(51) Int. Cl.
| | |
|---|---|
| *B63G 13/00* | (2006.01) |
| *B63B 11/02* | (2006.01) |
| *B63B 43/18* | (2006.01) |
| *B63B 79/10* | (2020.01) |
| *B63B 79/40* | (2020.01) |

(52) U.S. Cl.
CPC .............. *B63G 13/00* (2013.01); *B63B 11/02* (2013.01); *B63B 43/18* (2013.01); *B63B 79/10* (2020.01); *B63B 79/40* (2020.01)

(58) Field of Classification Search
CPC ......... B63G 13/00; B63B 79/40; B63B 79/10; B63B 11/02; B63B 43/18
See application file for complete search history.

(56) References Cited

U.S. PATENT DOCUMENTS

| | | |
|---|---|---|
| 7,328,740 B2 | 2/2008 | Leeson et al. |
| 11,507,094 B2 | 11/2022 | Hanson et al. |
| 2004/0035347 A1* | 2/2004 | Grober .................... B63B 29/12 114/191 |
| 2015/0002621 A1 | 1/2015 | Ratner et al. |
| 2016/0070265 A1* | 3/2016 | Liu ........................ B64C 39/024 701/25 |
| 2017/0083020 A1* | 3/2017 | Purwin ................ G05D 1/0891 |
| 2018/0335178 A1* | 11/2018 | Bin ......................... F16M 11/18 |
| 2019/0232744 A1 | 8/2019 | Bein et al. |

FOREIGN PATENT DOCUMENTS

| | | | | |
|---|---|---|---|---|
| AU | 2023377816 A1 | | 6/2025 | |
| CN | 113574856 B | | 9/2024 | |
| JP | 2023013785 A | | 1/2023 | |
| KR | 20110018288 A | * | 2/2011 | ............. B63G 13/00 |
| WO | WO-2013081561 A1 | * | 6/2013 | ........... B63B 39/005 |

OTHER PUBLICATIONS

Search Report under Section 17(5) for GB Application No. 2503131.1 mailed Aug. 13, 2025.
Search Report under Section 17(5) for GB Application No. 2503144.4 mailed Sep. 17, 2025.

* cited by examiner

*Primary Examiner* — Stephen P Avila
(74) *Attorney, Agent, or Firm* — MARSHALL, GERSTEIN & BORUN LLP

(57) ABSTRACT

A payload re-positioning system for a maritime vehicle that includes a hull having a first portion and a second portion. The maritime vehicle includes a payload disposed within the second portion. The first portion may include an impact zone and a compressible zone. The impact zone is arranged to engage a target external to the maritime vehicle. The compressible zone is arranged to reduce the initial length of the first portion to a compressed length in response to the impact zone engaging the target external, thereby reducing a distance between the payload and the impact zone.

26 Claims, 22 Drawing Sheets

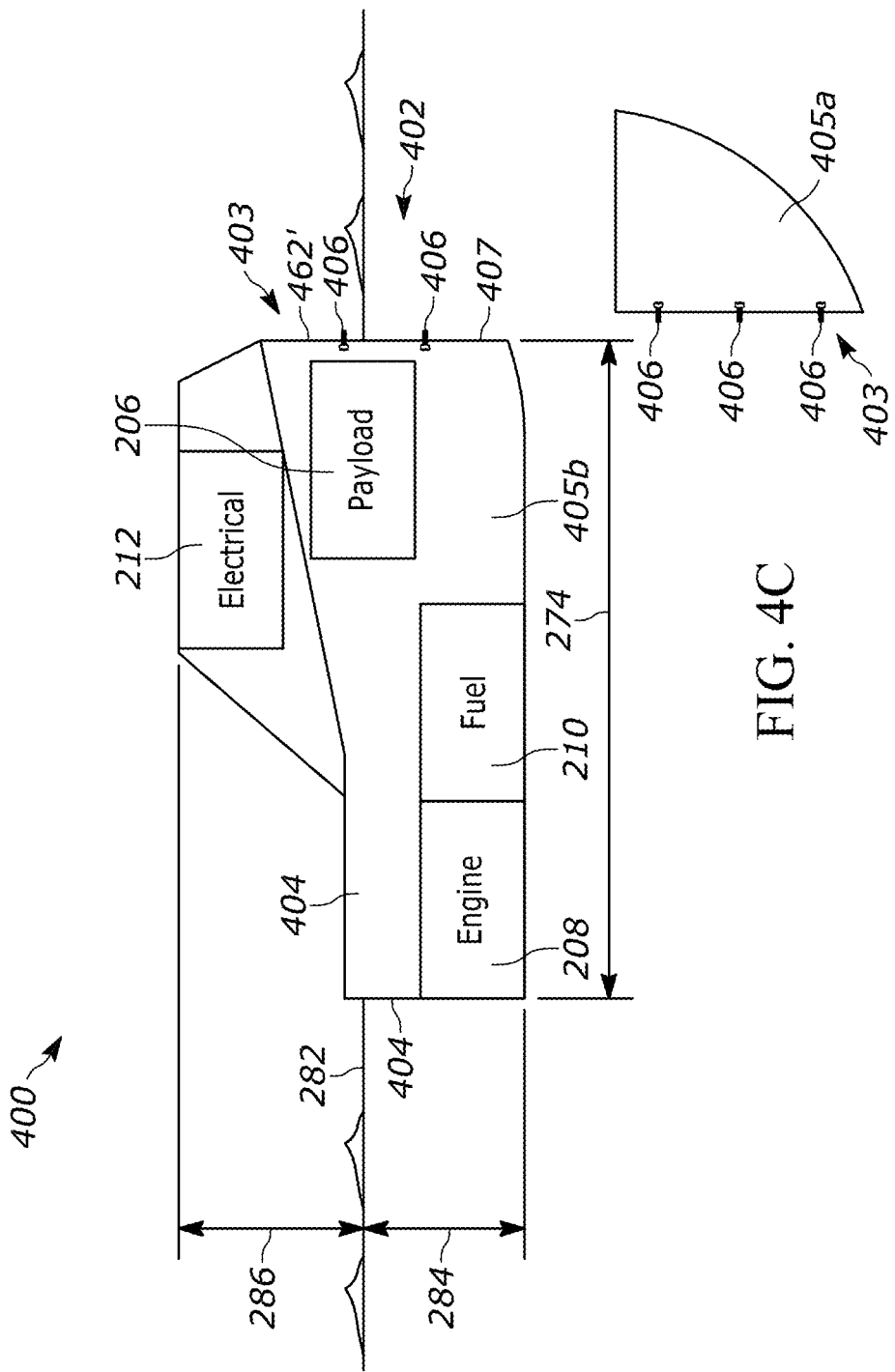

PAYLOAD RE-POSITIONING SYSTEM FOR A MARITIME VEHICLE

CROSS-REFERENCE TO RELATED APPLICATION

The present application claims priority to U.S. Provisional Patent Application No. 63/679,854, titled "Payload Re-positioning System for a Maritime Vehicle" and filed Aug. 6, 2024, the contents of which are hereby incorporated by reference in its entirety.

FIELD OF THE DISCLOSURE

The present disclosure relates to maritime vehicles and, more particularly, to a payload re-positioning system for a maritime vehicle.

BACKGROUND

Maritime vehicles, or vehicles designed for use in a maritime environment, are commonly used for transportation, recreation, defense, scientific research, and other purposes. Examples of maritime vehicles include boats, watercraft, submarines, and amphibious vehicles. Maritime vehicles can be manned (i.e., operated by an onboard human) or unmanned, and unmanned maritime vehicles can be remotely controlled or can be autonomous.

In some examples, the maritime vehicle may include various equipment and components that require special control. For example, the maritime vehicle can include a payload that comprises military equipment such as bulk charges (explosives).

SUMMARY

In some aspects, the techniques described herein relate to a maritime vehicle, including: a hull having a first portion and a second portion disposed adjacent the first portion; and a payload disposed within the second portion; the first portion including a crumple zone arranged to reduce an initial length of the first portion to a reduced length in response to impact with a target external to the maritime vehicle, thereby reducing a distance between the payload and an impact zone of the hull.

In some aspects, the techniques described herein relate to a maritime vehicle, further including a timer for the payload and a controller communicatively connected to the timer, wherein the controller activates the timer after the maritime vehicle impacts the target.

In some aspects, the techniques described herein relate to a maritime vehicle, wherein the first portion includes a bow of the maritime vehicle, and wherein the impact zone is disposed on a stem of the bow.

In some aspects, the techniques described herein relate to a maritime vehicle, wherein the first portion is made of a first material having a first shear modulus value and the second portion is made of a second material having a second shear modulus value, the first shear modulus value being lower than the second shear modulus value.

In some aspects, the techniques described herein relate to a maritime vehicle, wherein the payload is detonated within the hull and at least partially disposed within a submerged portion of the maritime vehicle.

In some aspects, the techniques described herein relate to a maritime vehicle, wherein the crumple zone at least partially telescopes into the second portion when the impact zone impacts the target.

In some aspects, the techniques described herein relate to a maritime vehicle, wherein the crumple zone includes a discontinuity formed in the hull between the first portion and the second portion, at least one of the first and second portions selectively separable from the discontinuity.

In some aspects, the techniques described herein relate to a maritime vehicle, including: a hull having a first portion and a second portion disposed adjacent the first portion; a payload disposed within the second portion; a securement mechanism having a first state and a second state, the securement mechanism couples the first portion to the second portion when the securement mechanism is in the first state and releases the first portion from the second portion when the securement mechanism is in the second state; and a controller communicatively connected to the securement mechanism, wherein, when the maritime vehicle engages a target external to the maritime vehicle, the controller causes the securement mechanism to transition from the first state to the second state.

In some aspects, the techniques described herein relate to a maritime vehicle, wherein the securement mechanism includes a frangible bolt.

In some aspects, the techniques described herein relate to a maritime vehicle, further including a bulkhead disposed between the first portion and the second portion, wherein the bulkhead forms a watertight seal for the second portion when the first portion is detached from the second portion.

In some aspects, the techniques described herein relate to a maritime vehicle to, further including a sensor system, wherein the controller causing the securement mechanism to transition to the second state in response to the sensor system detecting a target is within a predetermined distance from the maritime vehicle.

In some aspects, the techniques described herein relate to a maritime vehicle to, further including a timer communicatively connected to the controller, wherein the controller activates the timer after the maritime vehicle engages the target, and wherein the payload detonates within the hull in response to the timer operating for a predetermined period of time.

In some aspects, the techniques described herein relate to a maritime vehicle, including: a hull having a first portion and a second portion disposed adjacent the first portion; a payload movably disposed in the second portion; an actuator coupled to the payload; and a controller communicatively connected to the actuator and the payload, wherein the controller causes the actuator to move the payload from the second portion to the first portion and causes the payload to detonate when the payload is at least partially in the first portion.

In some aspects, the techniques described herein relate to a maritime vehicle, further including a timer for the payload, wherein the controller causes the payload to detonate after the timer operates for a predetermined period of time.

In some aspects, the techniques described herein relate to a maritime vehicle, wherein the controller activates the timer after causing the actuator to move the payload from the second portion to the first portion.

In some aspects, the techniques described herein relate to a maritime vehicle, further including a translation structure; wherein the payload is movably disposed on the translation structure and the actuator causes the payload to move along the translation structure from the second portion to the first portion.

In some aspects, the techniques described herein relate to a maritime vehicle, wherein the translation structure includes a rail extending between the second portion and the first portion.

In some aspects, the techniques described herein relate to a maritime vehicle, wherein the rail is a structural stringer of the maritime vehicle.

In some aspects, the techniques described herein relate to a maritime vehicle, wherein the actuator includes a hydraulic actuator having a first end and a second end, the first end coupled to the maritime vehicle and the second end coupled to the payload.

In some aspects, the techniques described herein relate to a method of managing a maritime vehicle payload, the method including: providing a maritime vehicle including a hull having a first portion, a second portion, and a payload; disposing the payload within the second portion of the maritime vehicle; controlling a relative position of the payload by reducing a distance between the payload and an impact zone of the first portion; and activating the payload to detonate within the hull after reducing the distance between the payload and the impact zone of the first portion.

In some aspects, the techniques described herein relate to a method, wherein controlling relative position of the payload includes transitioning the first portion of the maritime vehicle from having a first length to a reduced length shorter than the first length.

In some aspects, the techniques described herein relate to a method, wherein controlling relative position of the payload includes moving the payload from the second portion to the first portion.

In some aspects, the techniques described herein relate to a method, wherein moving the payload from the second portion to the first portion includes moving the payload along a rail.

In some aspects, the techniques described herein relate to a method, wherein moving the payload along a rail includes actuating a hydraulic actuator coupled to the maritime vehicle and the payload.

BRIEF DESCRIPTION OF THE DRAWINGS

The present disclosure is described in the following detailed description in conjunction with the drawings, wherein:

FIG. 4C is similar to FIG. 4B but shows the maritime vehicle in the engaged mode.

Figure 1A:
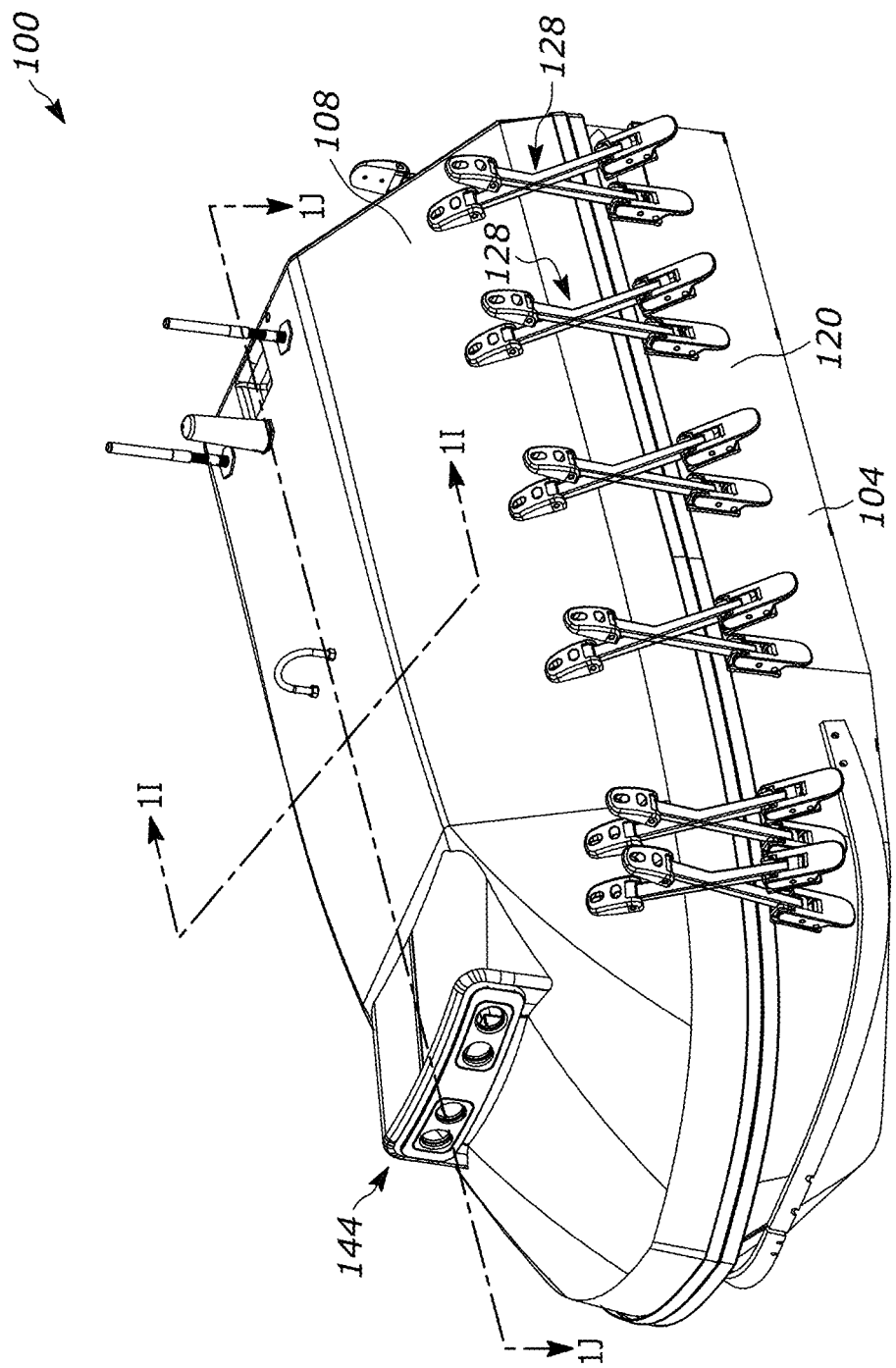
FIG. 1A is a top perspective view of an example of a maritime vehicle in accordance with the teachings of the present disclosure.
Figure 1B:
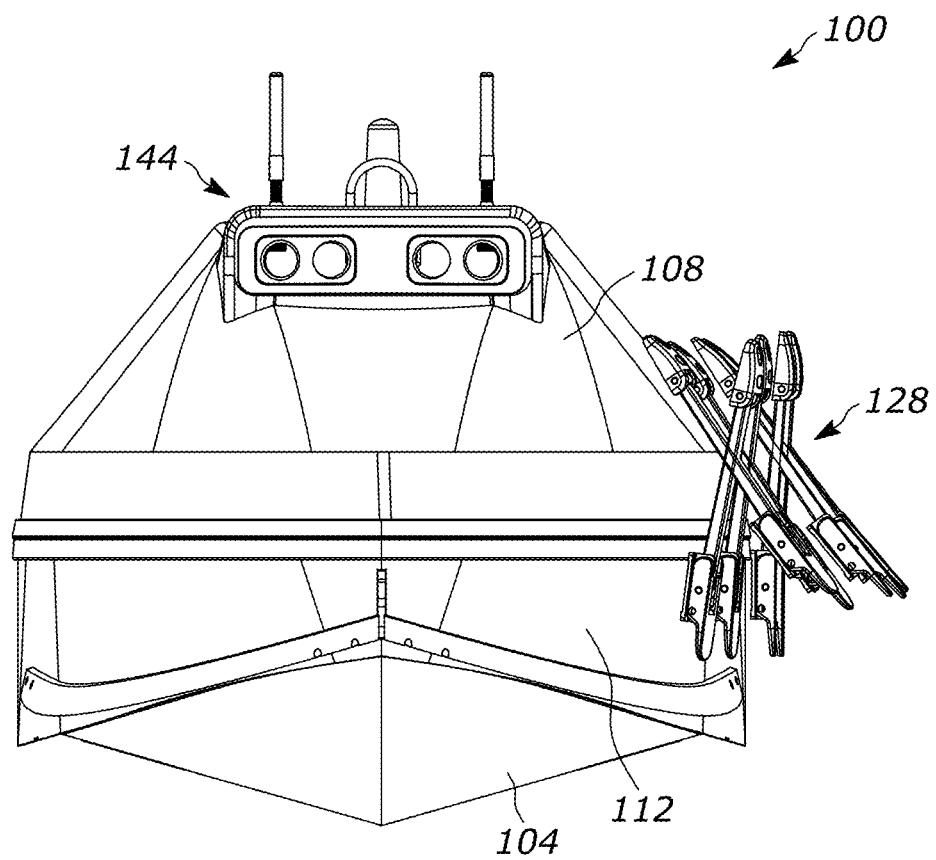
FIG. 1B is a front view of the maritime vehicle of FIG. 1A.
Figure 1C:
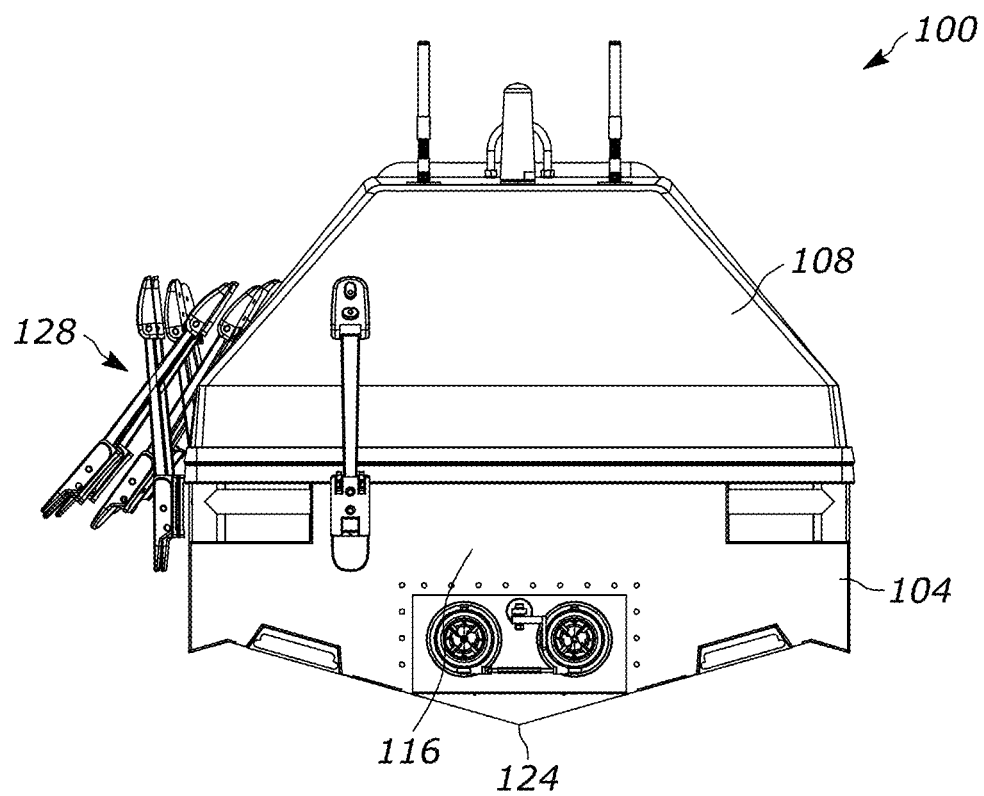
FIG. 1C is a rear view of the maritime vehicle of FIG. 1A.
Figure 1D:
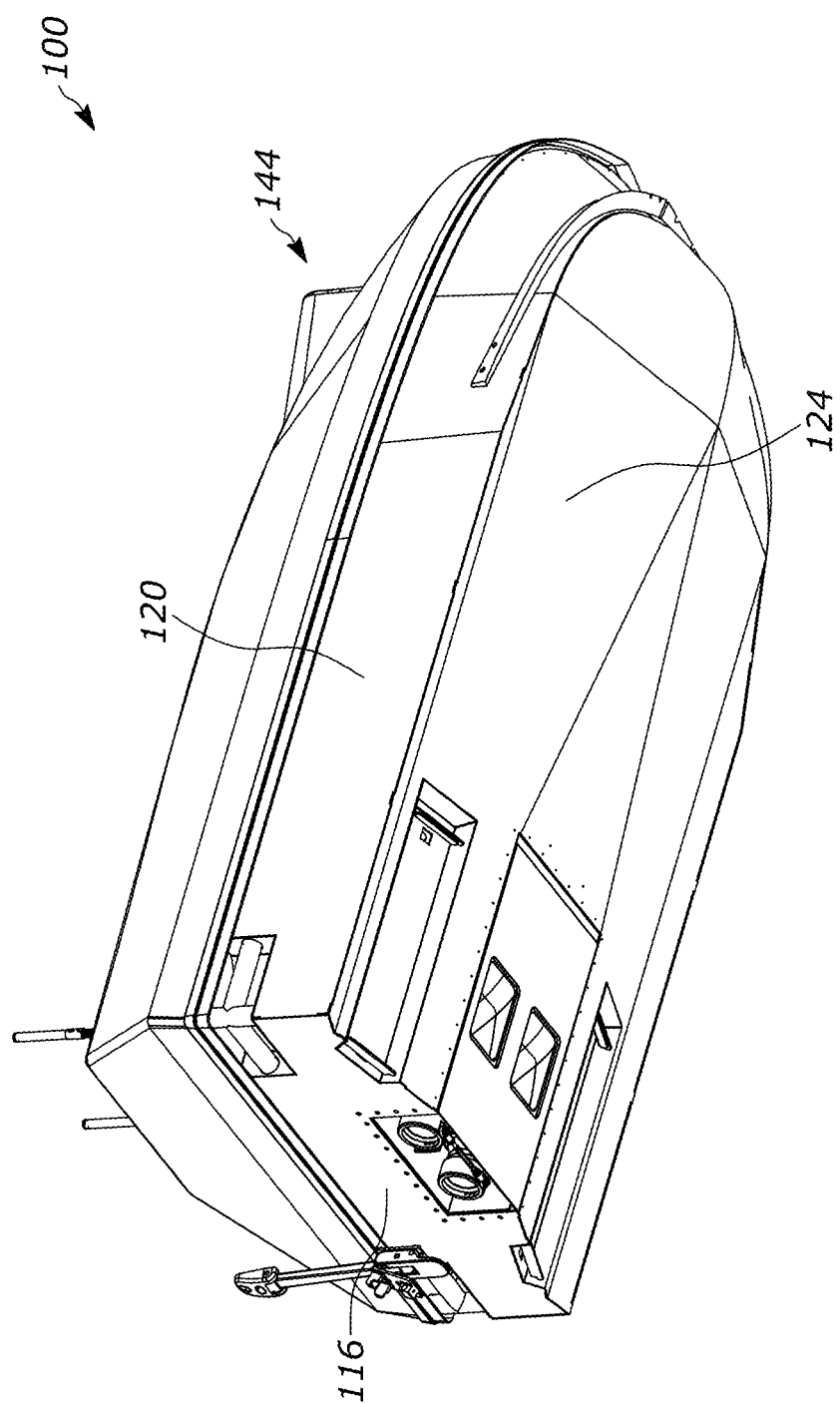
FIG. 1D is a bottom perspective view of the maritime vehicle of FIG. 1A.
Figure 1E:
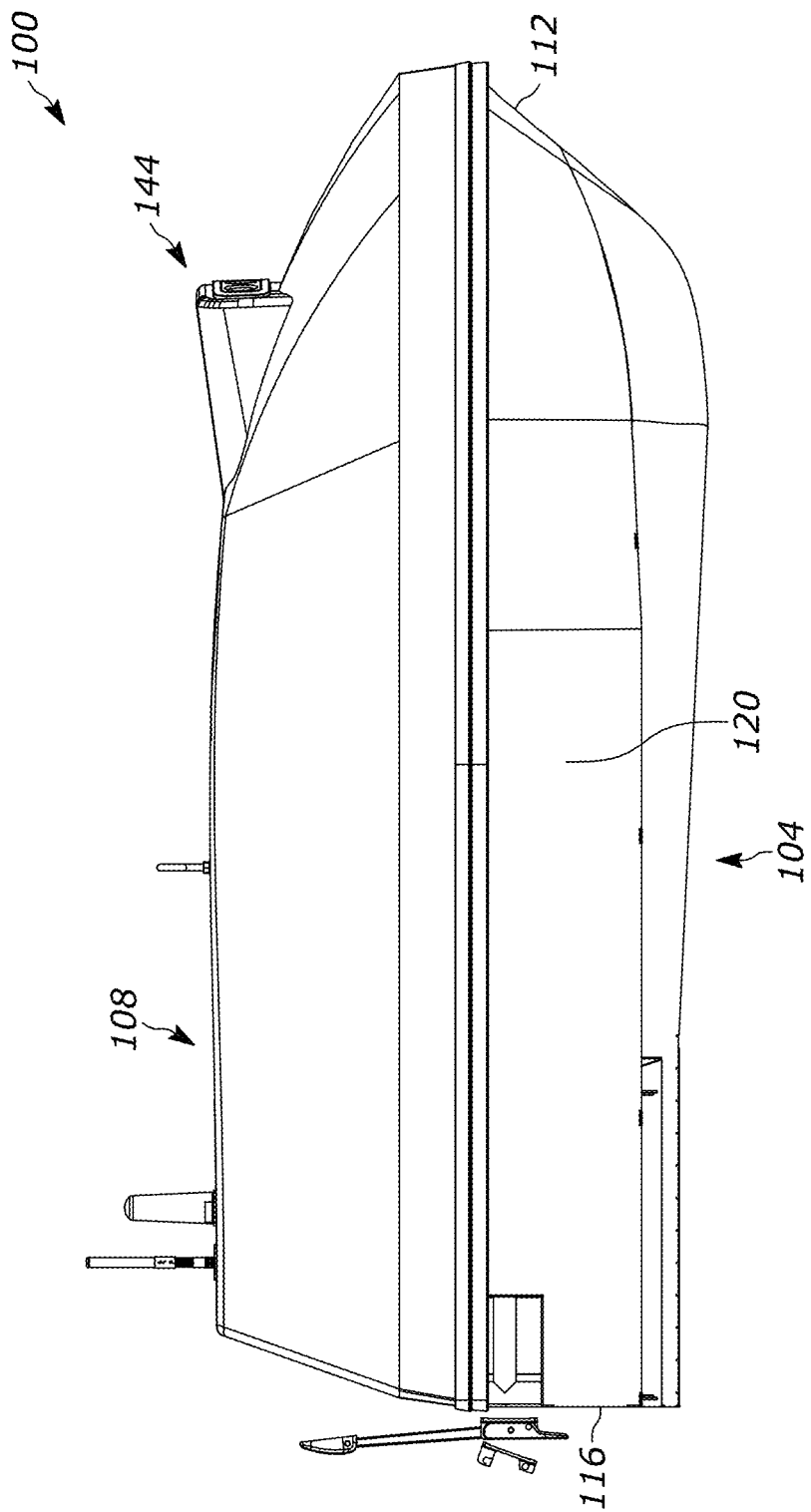
FIG. 1E is a side view of the maritime vehicle of FIG. 1A.
Figure 1F:
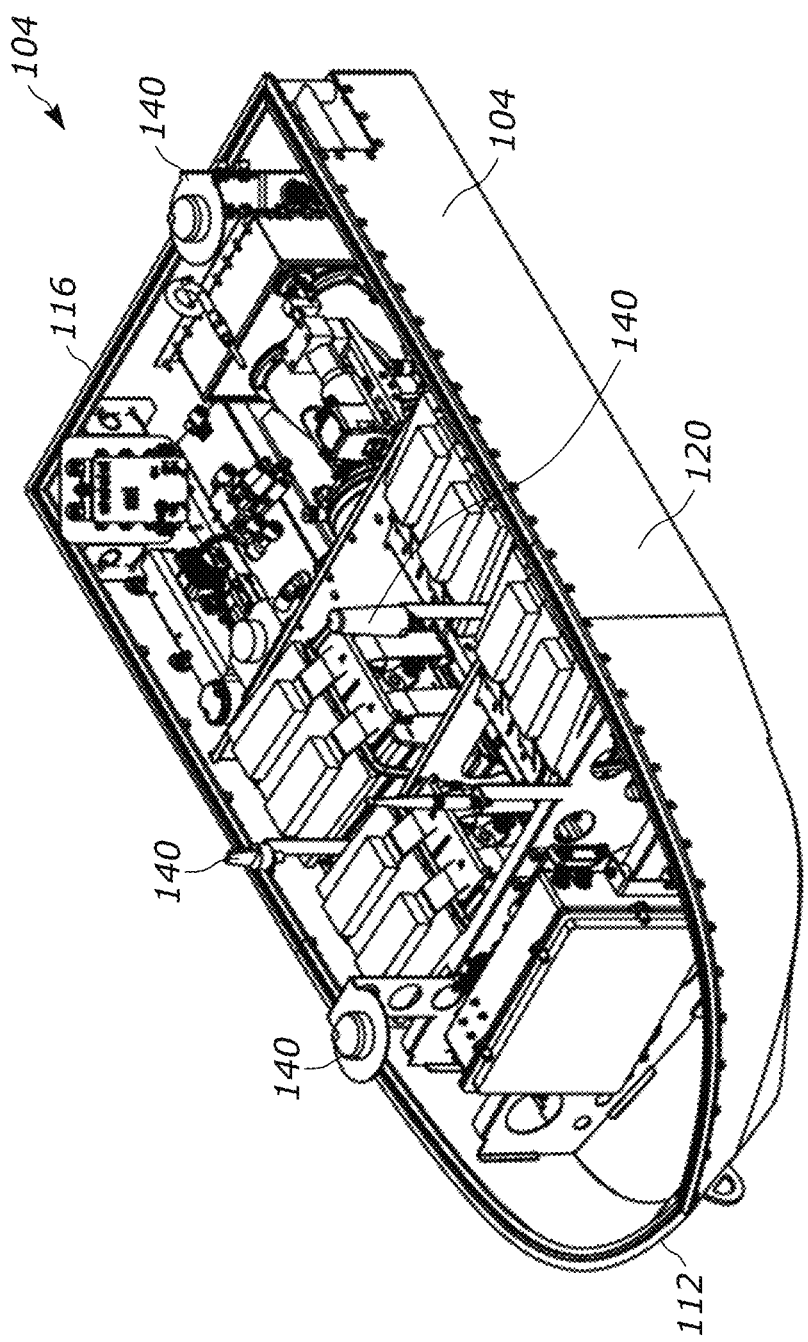
FIG. 1F is similar to FIG. 1A, but with the cap and various components of the maritime vehicle removed for illustrative purposes.
Figure 1G:
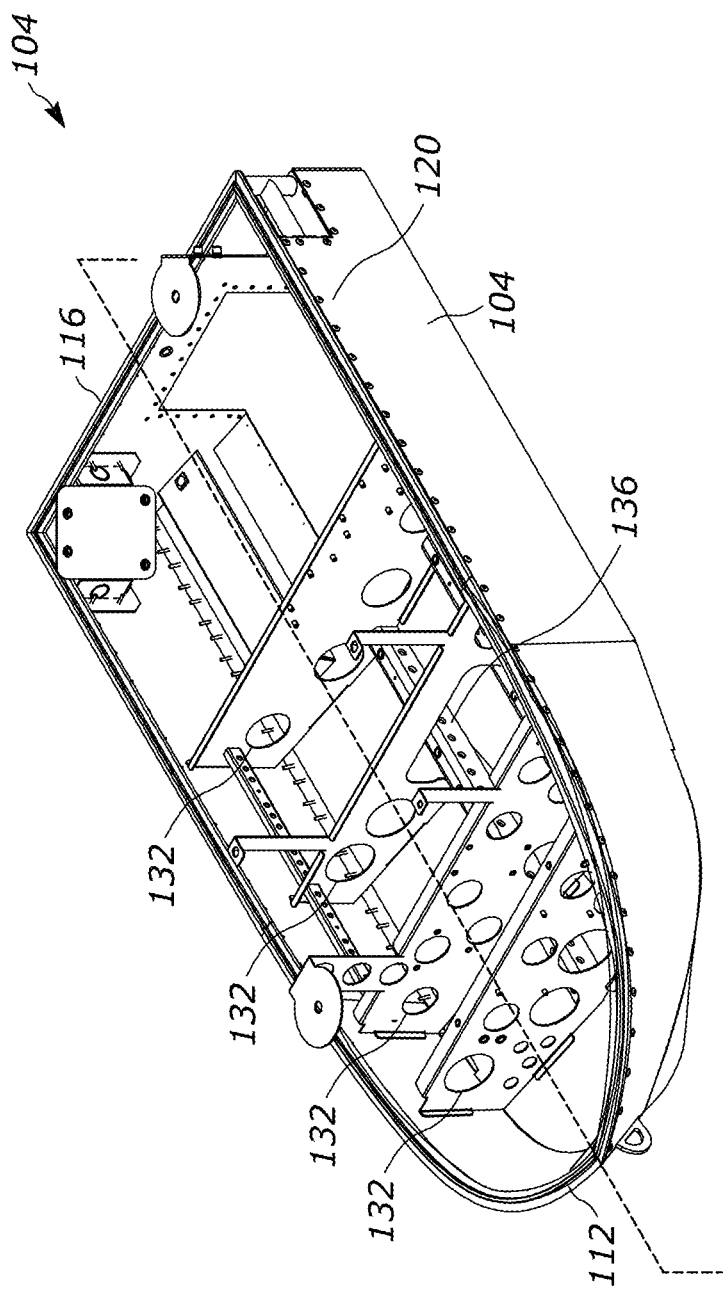
FIG. 1G is similar to FIG. 1F, but with additional components of the maritime vehicle removed for illustrative purposes.
Figure 1H:
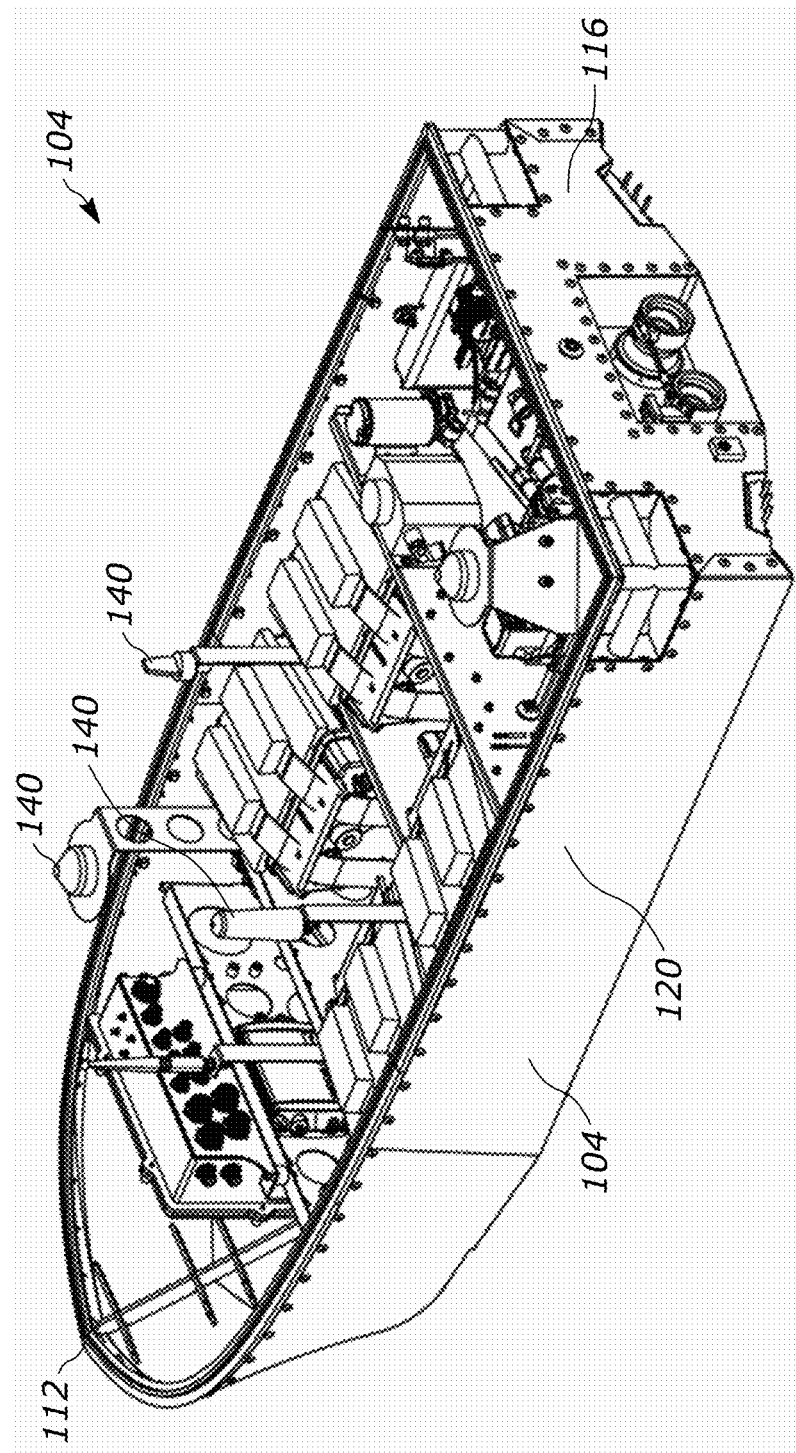
FIG. 1H is a rear, perspective view of the maritime vehicle of FIG. 1F.
Figure 1I:
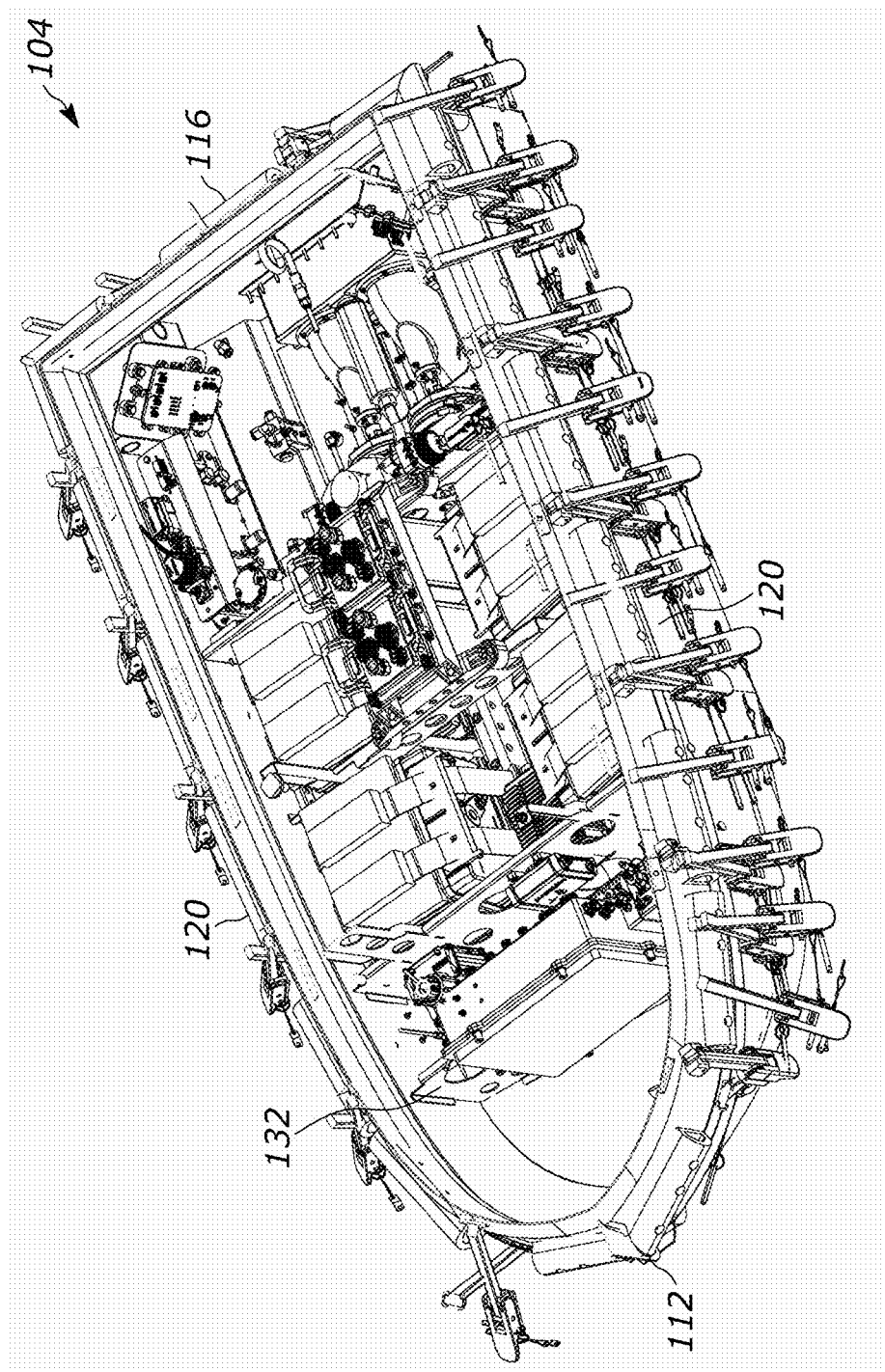
FIG. 1I is a first cross-sectional view taken along line I-I in FIG. 1A.
Figure 1J:
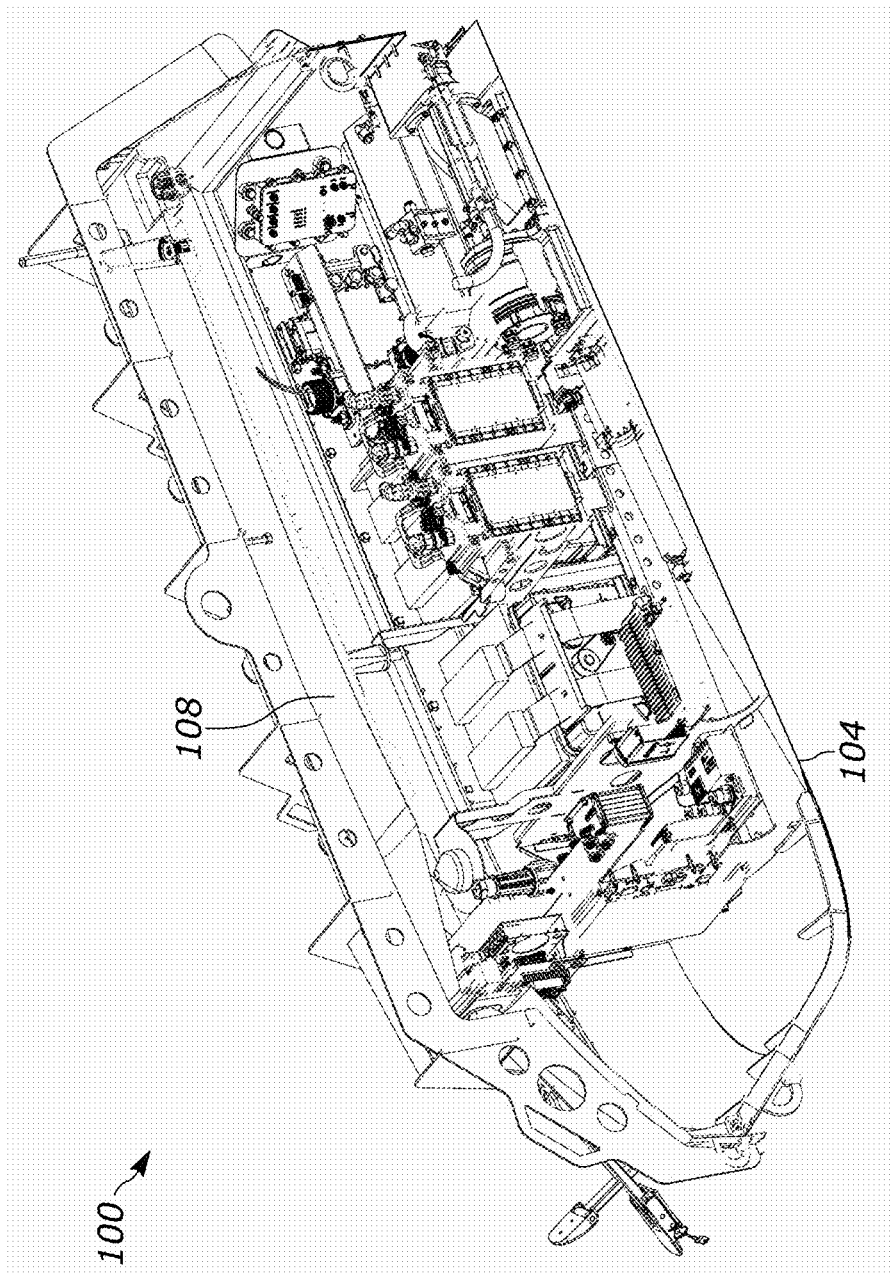
FIG. 1J is a second cross-sectional view taken along line J-J in FIG. 1A.
Figure 1K:
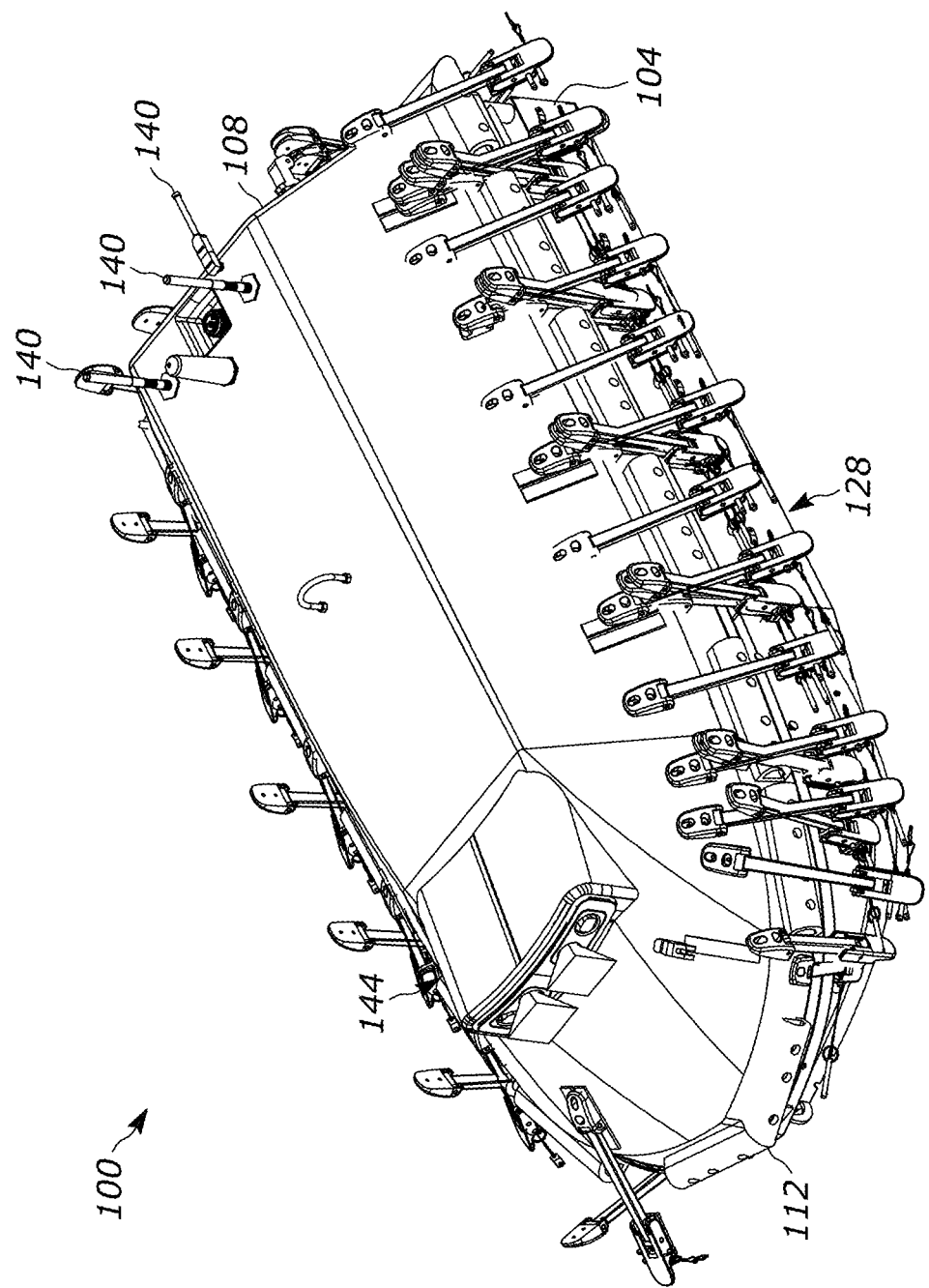
FIG. 1K is similar to FIG. 1A, but with the latching assembly of the maritime vehicle partially removed for illustrative purposes.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The present disclosure is directed to a maritime vehicle that is primarily intended for use for military purposes (e.g., for naval defense, patrolling waters and enforcing laws, reconnaissance, naval exploration, monitoring) but can also be used for other purposes if desired. The maritime vehicle is durable and configured to quickly, efficiently, and stealthily traverse a body of water once dispatched (e.g., from other maritime vehicles, beachheads, or an airdrop). The maritime vehicle is modular, with components that can be flexibly altered, removed, or added as desired in accordance with the mission of the maritime vehicle. The maritime vehicle can collaborate with other similar maritime vehicles and/or military assets when necessary. The maritime vehicle is preferably unmanned and autonomous though need not be.

FIGS. 1A-1K illustrate one example of a maritime vehicle 100 constructed in accordance with the teachings of the present disclosure. The maritime vehicle 100 is an unmanned vessel configured to autonomously traverse a body of water. The maritime vehicle 100 generally includes a hull 104 and a cap 108 that is coupled to the hull 104 to secure various components within the maritime vehicle 100. The hull 104 is at least partially disposed in the body of water in which the maritime vehicle 100 is traversing. The hull 104 in this example is a mono-hull that has a front (or bow) 112, a rear (or stern) 116, two sides 120, and a keel 124 coupled to another. The front 112, the rear 116, the sides 120, and the keel 124 can be welded together or can be coupled to one another in a different manner. For example, the front 112, the rear 116, the sides 120, and the keel 124 can be coupled together in the manner described in U.S. Provisional Application No. 63/561,282, titled "Systems and Approaches for Assembling a Maritime Vehicle" and filed Mar. 4, 2024, the contents of which are hereby incorporated by reference herein. The hull 104 is configured such that the hull provides a continuous planning surface that allows the maritime vehicle 100 to be highly maneuverable and to ride along the top of a body of water at high speeds, even in extreme weather conditions and difficult to navigate bodies of water. Meanwhile, the cap 108 is coupled to the hull 104 to cover and/or conceal the components of the maritime vehicle 100 disposed in and carried by the hull 104 as the maritime vehicle 100 traverses the body of water.

The hull 104 is preferably entirely made of aluminum but can be partially or entirely be made of fiberglass and/or one or more other materials. In other examples, the maritime vehicle 100 can include two or more hulls (e.g., two parallel hulls). In this example, the cap 108 entirely covers the hull 104 (and the components therein). In other examples, however, the maritime vehicle 100 need not include the cap 108 or the cap 108 may only partially cover the hull 104 (and the components disposed therein).

In some examples, the cap 108 can be removably coupled to the hull 104 via a locking system. For example, as illustrated in FIGS. 1A-1K, the cap 108 can be removably coupled to the hull 104 via a plurality of latch mechanisms 128 disposed around a perimeter of the maritime vehicle 100. Thus, the cap 108 can be removed to allow access to the interior of the hull 104. In other examples, however, the cap 108 can be permanently coupled to the hull 104 to permanently conceal the components within the maritime vehicle 100.

The maritime vehicle 100 also includes a plurality of bulkheads 132 and a plurality of stringers 136 (only one of which is clearly visible in FIG. 1G) arranged within the hull 104. The bulkheads 132 are generally oriented along a horizontal or latitudinal direction, whereas the stringers 136 are generally oriented along a longitudinal direction that is parallel to or co-axial with a longitudinal axis L of the hull 104. In some examples, the stringers 136 are directly mounted to the keel 124. The stringers 136 may extend along the entire length of the hull 104 or only along a portion of the length of the hull 104. The bulkheads 132 (and, in some cases, the stringers 136) divide the maritime vehicle 100 into a plurality of different compartments for receiving and retaining different components in the maritime vehicle 100. In some examples, the bulkheads 132 and the stringers 136 are constructed such that the bulkheads 132 form watertight compartments within the maritime vehicle 100.

The maritime vehicle 100 also includes a sensor system that is generally configured to collect data about various components of the maritime vehicle 100 as well as data about the environment surrounding the maritime vehicle 100 (including data about objects in that environment). To this end, the sensor system generally includes a plurality of sensors disposed on an exterior or an interior of the maritime vehicle 100. The sensors can include, for example, one or more pressure sensors (e.g., positioned to detect the pressure of the ambient air external to the maritime vehicle 100, the pressure of the water in which the maritime vehicle 100 is disposed, the pressure within the maritime vehicle 100), one or more temperature sensors (e.g., positioned to measure a temperature of a component of the maritime vehicle 100, a temperature of ambient air external to the maritime vehicle 100, a temperature of water in which the maritime vehicle 100 is disposed), one or more acoustic sensors (e.g., sonar sensors), one or more LIDAR sensors, one or more location sensors (e.g., GPS sensors, compass sensors), one or more motion sensors (e.g., accelerometers, gyroscopes), one or more infrared sensors, one or more water sensors (e.g., a float switch, a capacitive sensor, an ultrasonic sensor, an electrical water sensor, etc.) to determine when water is present and/or present to a given extent (e.g., at a certain volume or level), one or more humidity sensors, one or more power sensors (e.g., configured to detect charging or fueling levels), one or more lighting sensors (e.g., daylight sensors), one or more imaging sensors (e.g., CCD sensors, CMOS sensors), one or more magnetic sensors, or combinations thereof.

The maritime vehicle 100 also includes a power system that is generally configured to power the maritime vehicle 100 (and the components of the maritime vehicle 100). The power system generally includes a propulsion system and one or more power sources configured to power the propulsion system (and the other components within the maritime vehicle 100). The propulsion system is generally configured to propel the maritime vehicle 100 in/on the water. The propulsion system can, for example, be a propeller-based thrust system or can be a jet pump-based thrust system such as the jet pump assembly described in U.S. Provisional Application No. 63/561,166, titled "Jet Pump Assembly for Maritime Vehicle" and filed Mar. 4, 2024, the contents of which are hereby incorporated by reference herein. The one or more power sources can include, for example, one or more batteries, fuel (e.g., gasoline, diesel) stored in tanks carried by the maritime vehicle 100, hydrogen stored in hydrogen tanks carried by the maritime vehicle 100, solar panels (e.g., mounted to an exterior of the vehicle 100), or other sources. The maritime vehicle 100 illustrated in FIGS. 1A-1K includes four battery assemblies each including a rechargeable battery. The maritime vehicle 100 illustrated in FIGS. 1A-1K also includes a retention assembly for the four battery assemblies, e.g., the retention assembly described in U.S. Provisional Application No. 63/561,063, titled "Power System for Maritime Vehicle" and filed Mar. 4, 2024, the contents of which are hereby incorporated by reference herein. The maritime vehicle 100 generally also includes a cooling system configured to cool the propulsion system and/or the one or more energy sources, thereby preventing these components from overheating and leading to failure of the maritime vehicle 100. For example, the maritime vehicle 100 can include the cooling system described in U.S. Provisional Application No. 63/561,181, titled "Micro-Keel Cooler for Maritime Vehicle" and filed Mar. 4, 2024, the contents of which are hereby incorporated by reference herein.

In operation, the maritime vehicle 100 may be used to deploy and/or retrieve payloads such as, for example, persons, weapons (e.g., drones, missiles, mines, bombs), cargo (e.g., food), scientific instruments, or other equipment. Payloads can be deployed aerially (into the air), underwater, or on the surface of the water. Payloads can also be retrieved from the air, from underwater, or the surface of the water. Payloads to be deployed can be disposed in the hull 104, attached to the exterior surface of the hull 104, or attached to the exterior surface of the cap 108 prior to deployment. Likewise, retrieved payloads can be stored in the hull 104, attached to and stored on the exterior surface of the hull 104, or attached to and stored on the exterior surface of the cap 108.

The maritime vehicle 100 can also include other systems to help with the operation of the maritime vehicle 100, namely a ballast system, a navigation system, and a vision system 144. The ballast system is generally configured to stabilize the maritime vehicle 100 in the water, regardless of whether the maritime vehicle 100 is stationary or on the move. To this end, the maritime vehicle 100 may include one or more ballast tanks or chambers selectively filled with water or air to vary the buoyancy of the maritime vehicle 100. Alternatively or additionally, the ballast system may include and utilize one or more inflatable devices to vary the buoyancy of the maritime vehicle 100. The ballast system may also provide for the selective submerging and re-surfacing of the maritime vehicle 100 in a similar manner. The navigation system, which may for example be an inertial navigation system, utilizes the sensors of the sensor system to track the position and orientation of the maritime vehicle 100 and to guide the maritime vehicle 100 to its desired location in the body of water (or in a different body of water). The vision system 144 is generally configured to capture, process, and analyze images obtained by the one or more image sensors and other data (e.g., data obtained by other sensors in the sensor system). The vision system 144 can in turn identify or classify the environment surrounding the maritime vehicle 100 (including objects in that environment). The vision system 144 can, for example, take the form of the vision system described in U.S. Non-Provisional application Ser. No. 19/070,345, titled "Vision System for Maritime Vehicle" and filed Mar. 4, 2025, the contents of which are hereby incorporated by reference herein.

The maritime vehicle 100 further includes a communications system that is generally configured to facilitate communication (i) between the maritime vehicle 100 and one or more central (remote) controllers, (ii) between the maritime vehicle 100 and one or more other maritime vehicles 100 and/or other military assets (e.g., planes, ships), and (iii) between different components of the maritime vehicle 100. The communications system generally includes one or more local controllers and one or more communication modules (e.g., one or more antennae, one or more receivers, one or more transmitters, one or more radios, one or more ethernet switches) to effectuate wired or wireless communication between the maritime vehicle 100 and the central controller (s) or other maritime vehicles 100. For example, the maritime vehicle 100 includes a plurality of antennae 140 disposed on an exterior of the cap 108 as well as a plurality of antennae 140 disposed in the hull 104.

The one or more local controllers are generally configured to communicate data (e.g., operational instructions, data from the sensor system, data from other maritime vehicles 100 or military assets) and to perform automated operations of the maritime vehicle 100 based on that data. In some examples, the maritime vehicle 100 includes a plurality of different local controllers. For example, the maritime vehicle 100 can include one or more propulsion controllers (for controlling the operation of the propulsion system), one or more sensor controllers (for controlling the sensors in the sensor system), one or more payload controllers (for deploying or retrieving payloads), one or more navigation controllers (as part of the navigation system), and one or more ballast controllers (for controlling the ballast system). It will be appreciated that each of the one or more controllers may be implemented as hardware (e.g., processor, die, integrated device), software (e.g., non-transitory processor readable medium), and/or combinations thereof, in one or more devices (e.g., processor, chip, computer, tablet, mobile device).

While not explicitly described or illustrated herein, it will be appreciated that the maritime vehicle 100 includes several additional components. For example, the maritime vehicle 100 includes various sealing elements configured to provide seals between different components of the vehicle 100 (or between the vehicle 100 and the environment surrounding the vehicle 100). As another example, the maritime vehicle 100 also includes various fasteners that help to couple the components of the maritime vehicle 100 together. As yet another example, the maritime vehicle 100 includes cabling that helps to communicatively couple components of the maritime vehicle 100 together. As yet another example, the maritime vehicle 100 includes various electrical components that help to operate the maritime vehicle 100, e.g., one or more relay boards, one or more DC-DC converters, one or more supervisor boards, and/or one or more brain boards.

Figure 2:
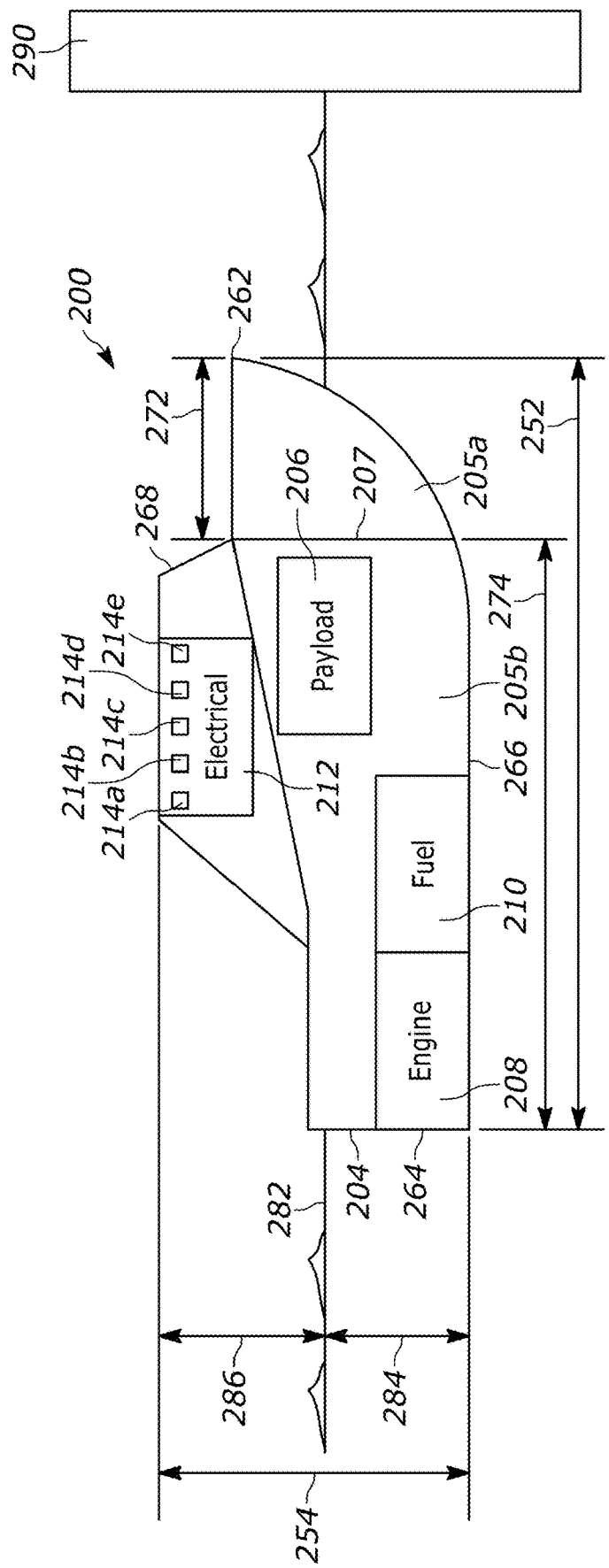
FIG. 2 is a schematic side view of another example of a maritime vehicle in accordance with the present disclosure.

FIG. 2 illustrates another example of a maritime vehicle 200 constructed in accordance with the teachings of the present disclosure. The maritime vehicle 200 is similar to the maritime vehicle 100 of FIGS. 1A-1K, in that the maritime vehicle 200 includes a hull 204 that is similar to the hull 104. However, the maritime vehicle 200 also includes means for optimally re-positioning a payload 206 carried by the maritime vehicle 200 relative to the hull 204 when the maritime vehicle 200 impacts (or directly contacts) or is within a pre-determined distance of a target 290 external to the maritime vehicle 200. More particularly, the means takes the form of a maritime vehicle payload re-positioning system that is configured to optimally re-position the payload 206 carried by the maritime vehicle 200 relative to the hull 204 when the maritime vehicle 200 impacts or is within the pre-determined distance of the target 290. In some examples, the maritime vehicle payload re-positioning system causes the payload 206 (which is initially disposed at a first position in which the payload 206 is disposed a first distance from a front of a bow 262 of the maritime vehicle 200) to be disposed at a second position in which the payload 206 is disposed a second distance from the front of the bow 262 that is less than the first distance. In other words, the maritime vehicle payload re-positioning system may also be referred to herein as means for causing the payload 206 to be disposed at a second position in which the payload is disposed at a second distance from the front of the bow 262 when the hull directly contacts or is within the pre-determined distance of the target 290. Further details regarding several, alternative example payload re-positioning systems are provided below.

As illustrated in FIG. 2, the hull 204 of the maritime vehicle 200 generally includes a first portion 205a and a second portion 205b. In this example, the first portion 205a includes all of a bow 262 of the maritime vehicle 200 (particularly a front of the bow 262), whereas the second portion 205*b* includes a mid-portion of the hull 204 and is adjacent to but rearward of the first portion 205*a*. In some examples, the second portion 205*b* can also include a portion of the bow 262 and/or part or all of a stern 264 of the maritime vehicle 200. In this example, the first portion 205*a* and the second portion 205*b* are divided by a bulkhead 207. The bulkhead 207 forms a watertight barrier between the first portion 205*a* and the second portion 205*b*. In other examples, the first portion 205*a* and the second portion 205*b* may not be divisible by the bulkhead 207 (or another structural element of the maritime vehicle 200).

Similar to the maritime vehicle 100, the maritime vehicle 200 includes a power system including an engine 208 and a fuel tank 210. The engine 208 and the fuel tank 210 are generally disposed in the second portion 205*b* of the hull 204. In this example, the engine 208 and the fuel tank 210 are disposed aft of the bulkhead 207 and closer to the stern 264 than the bow 262 of the maritime vehicle 200, with the engine 208 being disposed aft of the fuel tank 210. In various examples, the engine 208 can be any suitable marine engine system including an outboard motor, a shaft-driven propeller, a jet pump, etc. In this example, the engine 208 receives fuel (e.g., gasoline, diesel, natural gas) from the fuel tank 210. Alternatively, the engine 208 can include an electric motor and the fuel tank 210 can take the form of one or more battery packs. In such examples, the battery packs can be any applicable battery technology (e.g., lithium-ion, lead-acid, nickel-cadmium).

Additionally, the maritime vehicle 200 includes electrical systems 212 carried by the hull 204. In this example, the electrical systems 212 are located in the second portion 205*b* of the hull 204, aft of the bulkhead 207. In various examples, the electrical systems 212 can include a controller 214*a*, a sensor system 214*b* (like the sensor system described above in connection with the maritime vehicle 100), a communications system 214*c* (like the communications system described above in connection with the maritime vehicle 100), one or more digital and/or analog processors 214*d*, memories 214*e*, and other components necessary for operating, maintaining, and controlling the maritime vehicle 200. For example, the maritime vehicle 200 can include a processor 214*d* that is configured to receive and process data from the sensor system 214*b*, the communications system 214*c*, and/or the memories 214*e*. The processor 214*d* then, in conjunction with the controller 214*a*, sends electrical signals to control the operation of the maritime vehicle 200, including actuating various actuators (some described in greater detail in connection with FIG. 5), operating the communication system 214*c*, etc.

Generally speaking, the payload 206 can include any of a variety of different types of cargo located in one or multiple portions of the maritime vehicle 200. For example, the payload 206 can include various personal goods and supplies or military munitions (e.g., weapons platforms, bulk charges (explosives), ammunition). The bulk charges can be military grade explosives (e.g., made with military explosive material, sized for military explosive needs). In some such examples, when the payload 206 includes military munitions, the payload 206 may include various timers, fuses, casings, etc. For example, the payload 206 may include a timer or fuse configured to control detonation of the payload 206. In some examples, the controller 214*a* controls the detonation of the payload 206 by activating the timer or fuse, which in turn is configured to automatically detonate the payload 206 when the timer or fuse completes a pre-determined time period. In some examples, the pre-determined time period may only be a few microseconds. In some examples, the pre-determined time period may be one or a few seconds (e.g., 2 seconds, 3 seconds). In some examples, the controller 214*a* activates the timer or fuse after the electrical systems 212 receive an activation signal through the communication system 214*c* or process sensor data from the sensor system 214*b* (discussed in greater detail below).

The maritime vehicle 200 has an overall length 252 and an overall height 254. The length 252 and the height 254 are configured to provide an agile but stable platform. The overall length 252 is defined by and between the bow 262 and the stern 264, whereas the overall height 254 is defined by and between the keel 266 and a top 268 of the maritime vehicle 200. The first portion 205*a* has a first length 272 and the second portion 205*b* has a second length 274. The sum of the first length 272 and the second length 274 equals the overall length 252.

In normal operation (i.e., patrol mode), the maritime vehicle 200 is configured to autonomously traverse a body of water, in which case the maritime vehicle 200 is partially disposed under a surface 282 of the body of water. The portion of the maritime vehicle 200 disposed under the water surface 282 is the draft 284 and the portion of the maritime vehicle 200 above the water surface 282 is the freeboard 286. The sum of the heights of the draft 284 and the freeboard 286 equals the overall height 254. The heights of the draft 284 and the freeboard 286 can, of course, vary based on water temperature, salinity, the mass of the maritime vehicle 200, the buoyancy of the maritime vehicle 200, and various aerodynamic and hydrodynamic forces acting on the maritime vehicle 200. In some examples, the buoyancy of the maritime vehicle 200 could be adjustable such that the maritime vehicle 200 is a submersible (i.e., selectively and fully submergible under the water surface 282).

When the maritime vehicle 200 is in its patrol mode, the first portion 205*a* is either purposely left empty or includes various components and weight to maintain proper buoyancy and control of the maritime vehicle 200 along the length 252 of the maritime vehicle 200, whereas the second portion 205*b* includes the payload 206 (along with the engine 208 and the fuel tank 210, at least in this example). The payload 206 is, at least initially, placed in the second portion 205*b* to optimize the stability, agility, and performance of the maritime vehicle 200. Because in this example the payload 206 is a large bulk charge, the payload 206 is, in this example, disposed at approximately midship (i.e., halfway between the stern 264 and the bow 262 of the maritime vehicle 200) and as close to the keel 266 of the maritime vehicle 200 as possible. As shown in FIG. 2, the payload 206 is preferably partially or entirely disposed within the draft 284 (i.e., underwater) for maximum impact upon detonation.

In this example, the maritime vehicle 200 is configured for a single mission that entails the maritime vehicle 200 delivering the payload 206 (e.g., a large, bulk charge) to the target 290 (e.g., another maritime vehicle, dry dock, floating or solid pier structures, etc.) in a manner that substantially if not entirely destroys the maritime vehicle 200. In this example, the maritime vehicle 200 transitions from the patrol mode to an engaged mode when the maritime vehicle 200 is within a predetermined distance of the target (e.g., 1 kilometer, 250 meters, or in direct contact with the target 290). In the engaged mode, the maritime vehicle 200 operates differently than in the patrol mode. For example, the maritime vehicle 200 may engage in stealth operations when in the engaged mode to avoid detection by the target 290. Further, while in the engaged mode, the maritime vehicle 200 can activate a detonation mode in which the payload 206 is detonated. The maritime vehicle 200 will typically detonate the payload 206 after impacting, or making direct contact with, the target 290, though in some cases, the maritime vehicle 200 may detonate the payload 206 while spaced from the target 290. However, because the impact of the payload 206 is directly proportional to the distance between the payload 206 and the target 290, it is advantageous to position the payload 206 as close to possible to the target 290 prior to detonation. Thus, the vehicle payload re-positioning systems described in greater detail below are configured to control the relative position of the payload 206 relative to the hull 204 and, more particularly, to position the payload 206 as close as possible (or at least closer) to the bow 262 of the maritime vehicle 200 prior to or simultaneously with the detonation of the payload 206 (as at least in this example the bow 262 will be closest to the target 290). For example, the payload re-positioning systems described in greater detail below can reduce a distance between the payload 206 and the first portion 205a or a portion of the first portion 205a (e.g., the bow 262, the front of the bow 262). In other examples, the payload re-positioning systems can otherwise reduce the distance between the payload 206 and any other portion of the hull 204 (e.g., the port, the starboard, the stern 264, etc.). In various examples, the maritime vehicle 200 remains in an engaged mode up to, and including, direct contact with the target 290 and/or detonation of the payload in the detonation mode.

Figure 3A:
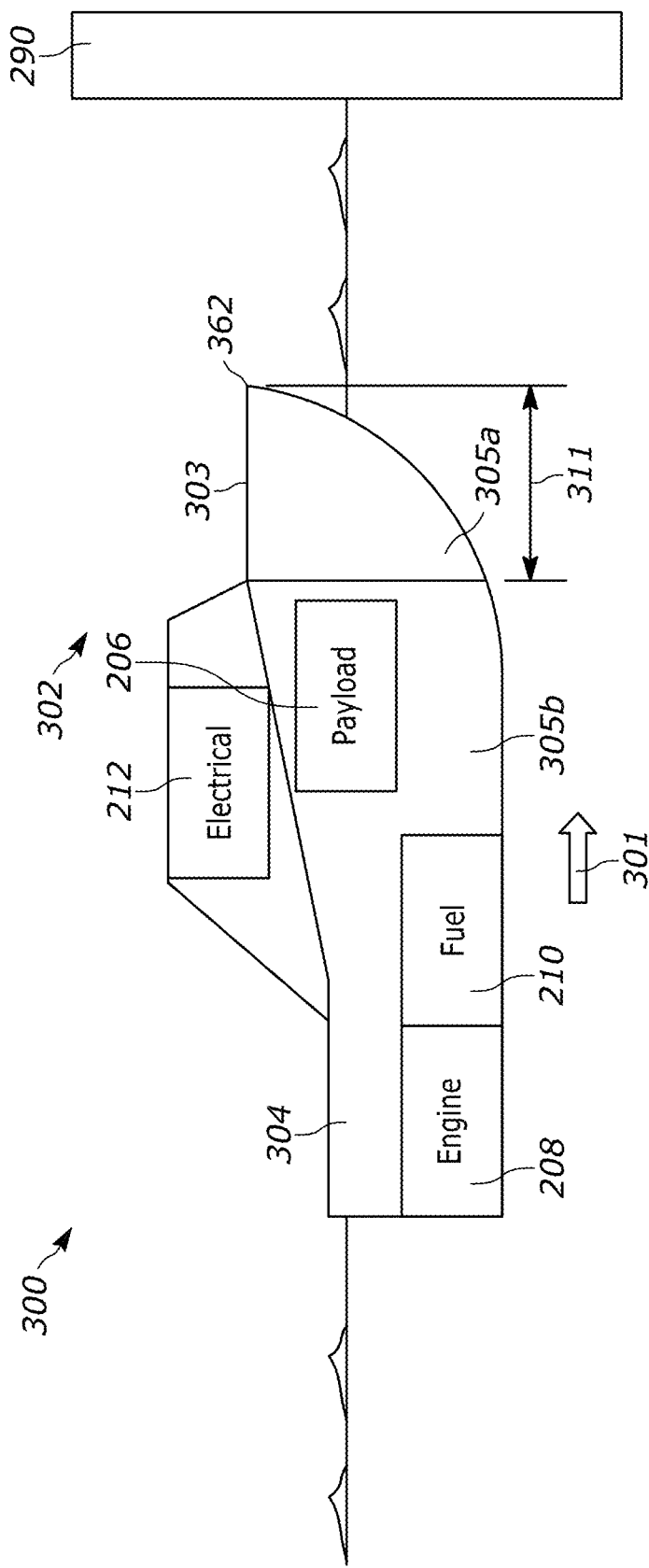
FIG. 3A is a schematic side view of another example of a maritime vehicle in accordance with the present disclosure and in a patrol mode.
Figure 3B:
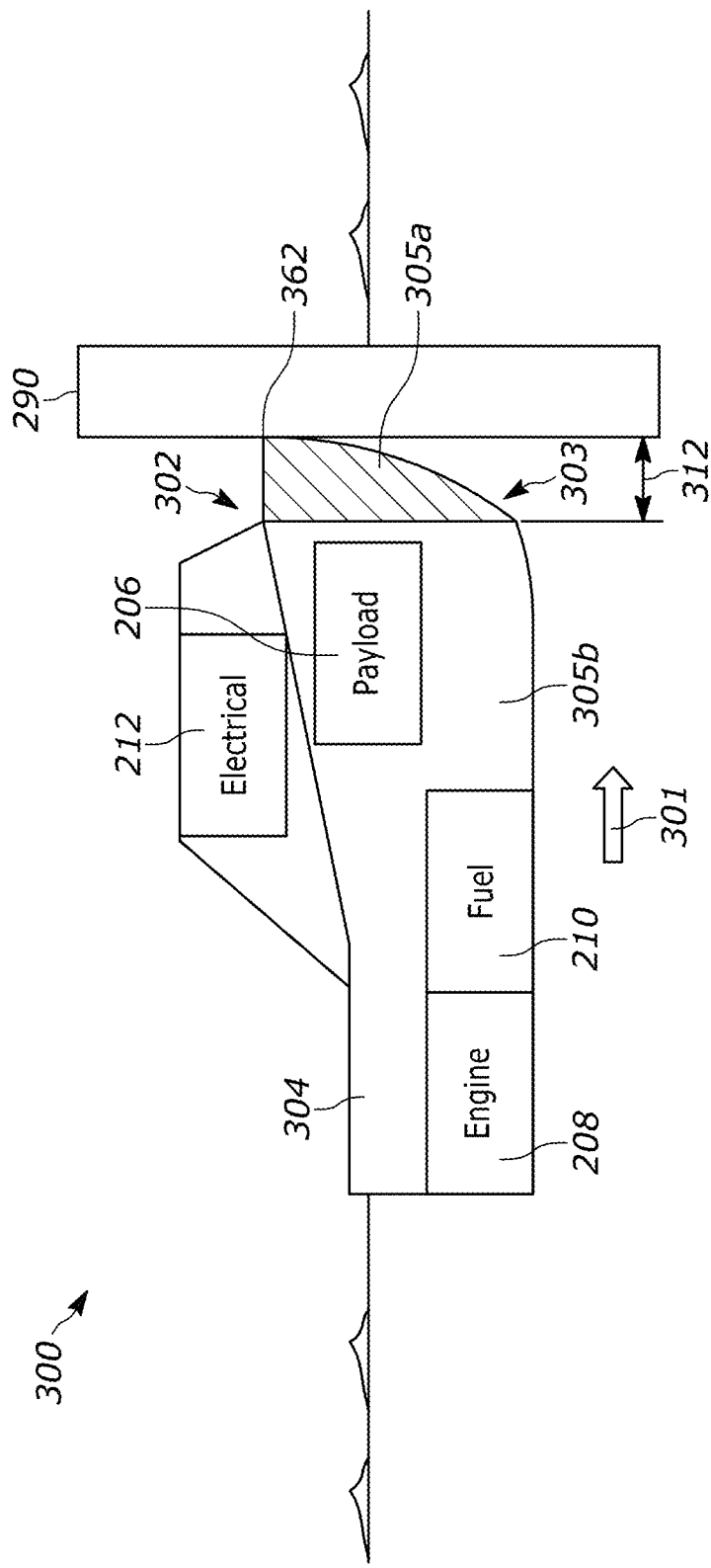
FIG. 3B is similar to FIG. 3A but shows the maritime vehicle transitioning into an engaged mode.
Figure 3C:
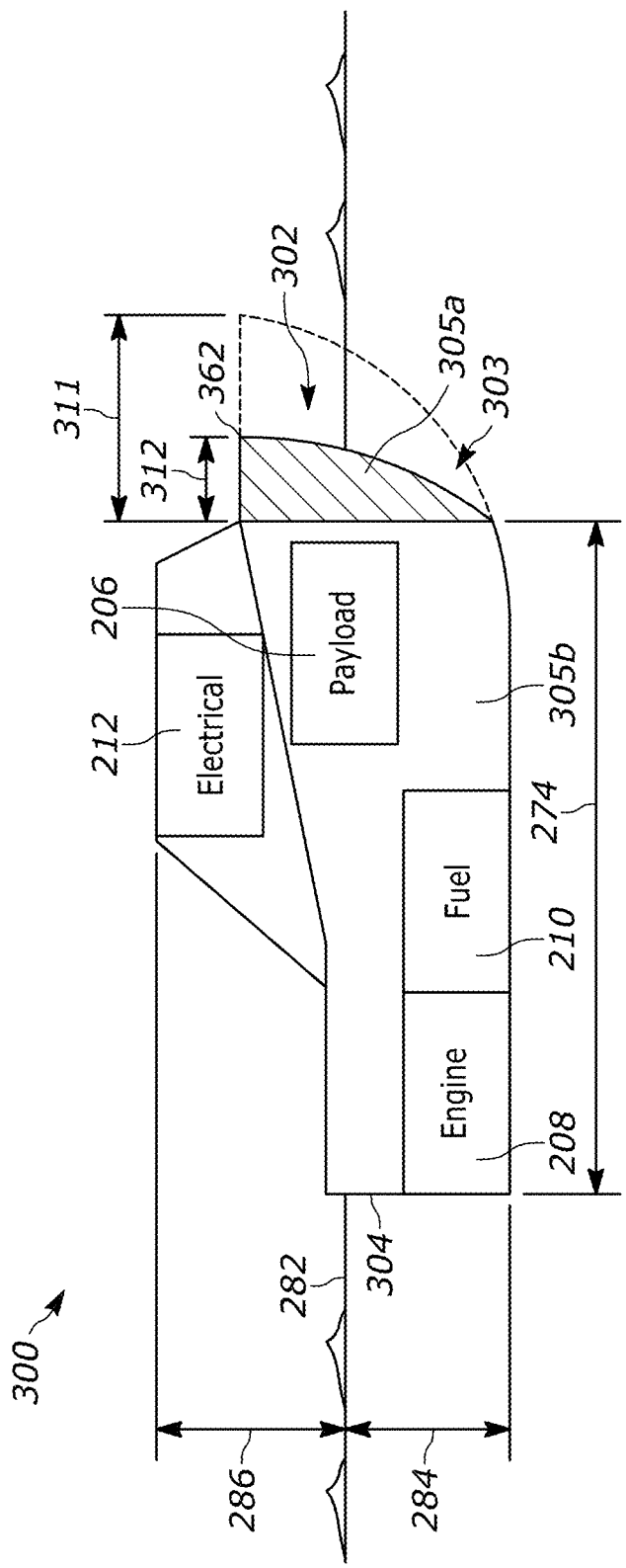
FIG. 3C is a schematic side view of the maritime vehicle of FIG. 3B, showing the position of a payload in the maritime vehicle relative to a bow of the maritime vehicle after the maritime vehicle reaches the engaged mode.

FIGS. 3A-3C illustrate a maritime vehicle 300 that is similar to the maritime vehicles 100, 200 and includes a first example payload re-positioning system 302 constructed in accordance with the teachings of the present disclosure. The payload re-positioning system 302 generally takes the form of a compressible zone such as a crumple zone 303 that forms part of a first portion 305a of the hull 304 (the first portion 305a being similar to the first portion 205a) and is structurally configured to crumple, fold, bend, and/or shear in response to the maritime vehicle 300 impacting (or directly engaging) the target 290. In FIG. 3A, the maritime vehicle 300 is shown as moving through a body of water at a forward velocity 301 towards the target 290. In FIG. 3B, the front of the bow 362 strikes or impacts the target 290 at or approximately at the velocity 301. In some examples, the maritime vehicle 300 causes damage to the target 290 upon impact, though the target 290 can be sufficiently strong to not be damaged by impact from the maritime vehicle 300. The maritime vehicle 300 collides with the target 290 such that the kinetic energy of the maritime vehicle 300 created by the maritime vehicle 300 moving at the forward velocity 301 causes the crumple zone 303 to crumple while the second portion 305b of the hull 304 (which is similar to the second portion 205b) remains substantially unaffected, as shown in FIG. 3C (which omits the target 290 for clarity). The crumpling of the crumple zone 303 in turn reduces the length of the first portion 305a (from an initial length 311 to a reduced length 312) as well as the volume of the first portion 305a, which in turn reduces the distance between the payload 206 (e.g., bulk charge) and the bow 362 of the maritime vehicle 300 (and, thus, the distance between the payload 206 and the target 290). In other examples, however, the maritime vehicle 300 can engage in an agile maneuver such that a portion other than the bow 362 (e.g., port, starboard, etc.) of the maritime vehicle 300 strikes the target 290 and causes the crumple zone 303 to crumple.

In the example shown in FIGS. 3B and 3C, the entire first portion 305a is the crumple zone 303. The first portion 305a is made of a first material or set of materials and the second portion 305b is made of a second material or set of materials, the first material(s) being softer and/or more flexible than the second material(s), thereby facilitating the crumple zone 303 but ensuring the rest of the hull 304 is substantially unaffected when the bow 362 impacts the target 290. For example, the first material(s) may have a shear modulus that is lower than the shear modulus of the second material(s). In some examples, the first portion 305a is made of an aluminum alloy having a shear modulus of between approximately 60 gigapascals (GPa) and 80 GPa, while the second portion 305b is made of a steel alloy having a shear modulus of between approximately 170 GPa and 200 GPa. Table 1 includes several example materials that can be used to form the first and/or second portions 305a, 305b and the approximate shear moduli values for these materials. In some examples, the use of composite materials is preferred because composite materials can tailor material properties at specified locations and in predetermined directions. In some examples, composite materials, such as composite laminates (e.g., fiberglass, aramid fibers, carbon fibers, resins) can be stronger in a first direction and more readily compress in a second direction.

TABLE 1

| Material | Shear Modulus (GPa) Approximate Values |
|---|---|
| Plastic (polypropylene, polyethylene, polytetrafluoroethylene, polyvinylchloride) | 0.1-0.2 |
| Aluminum alloys | 20-30 |
| Copper alloys | 40-50 |
| Steel alloys | 75-85 |

Figure 3D:
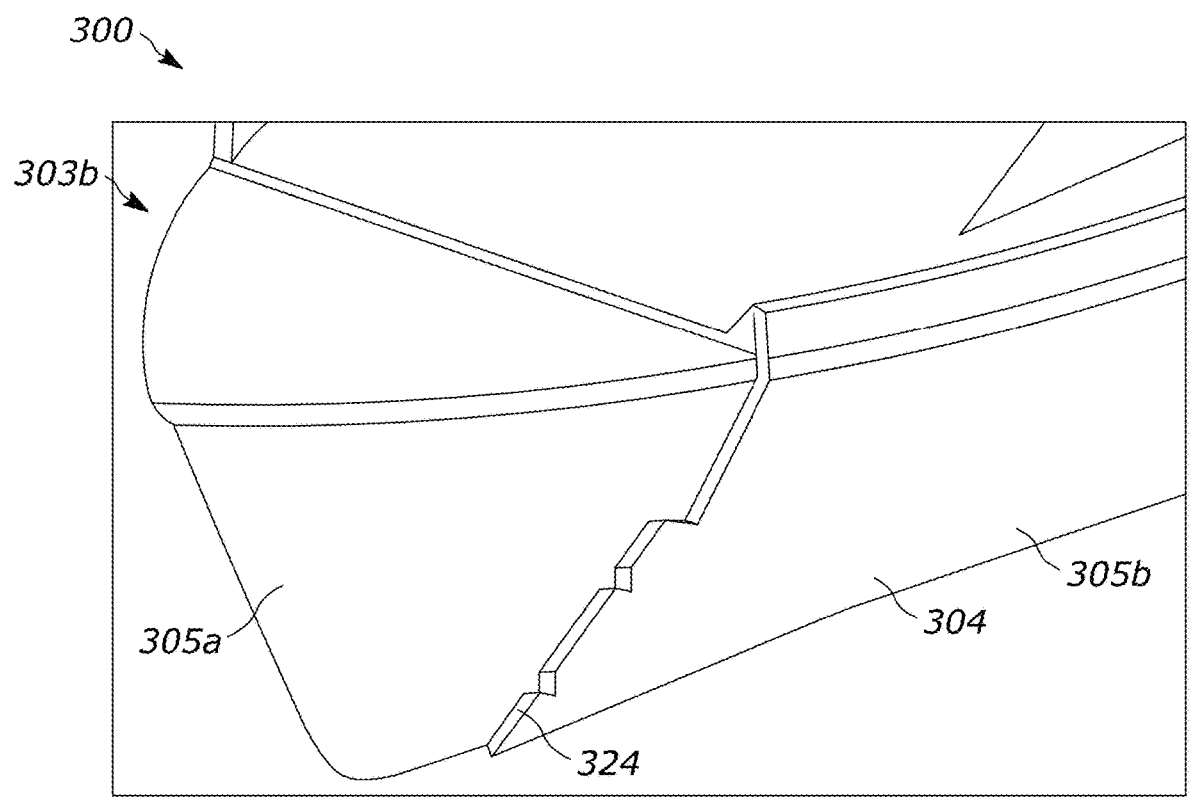
FIG. 3D is a partial perspective view of another example of a maritime vehicle made in accordance with the present disclosure.
Figure 3E:
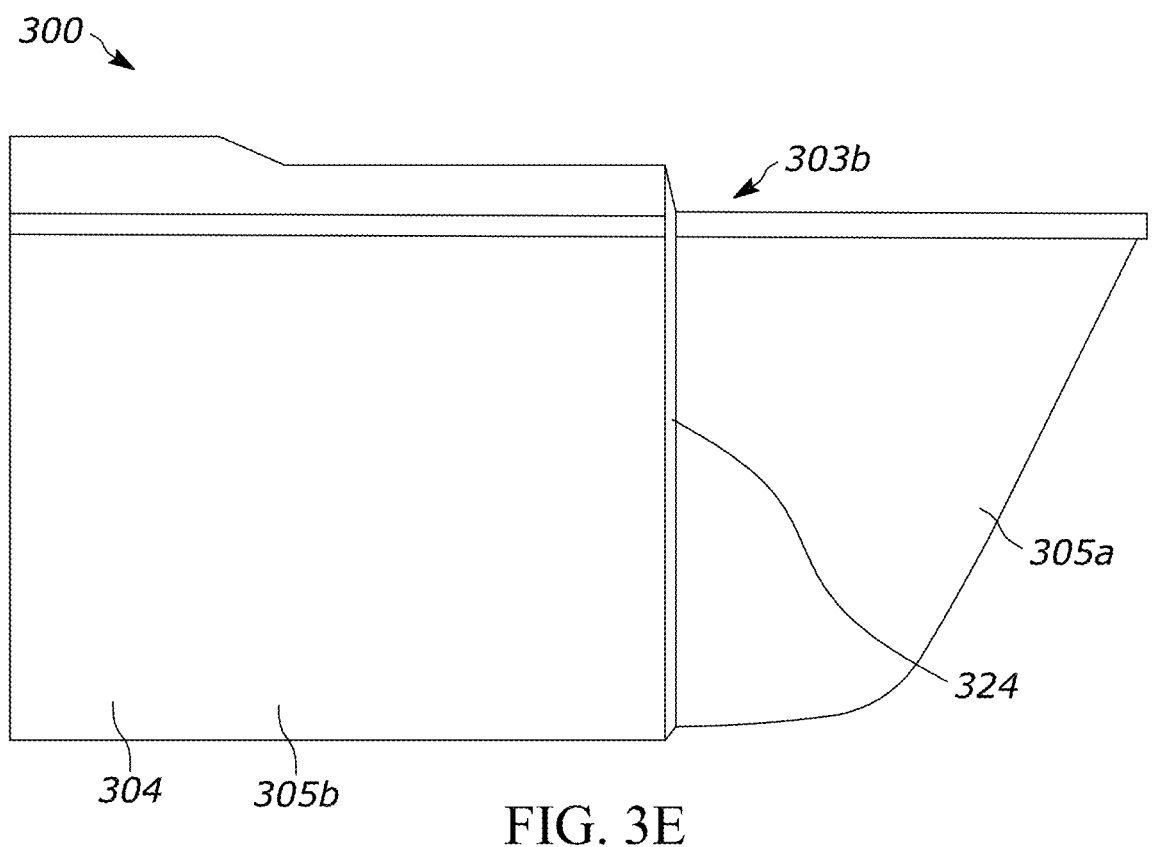
FIG. 3E is a partial side view of the maritime vehicle of FIG. 3D.
Figure 3F:
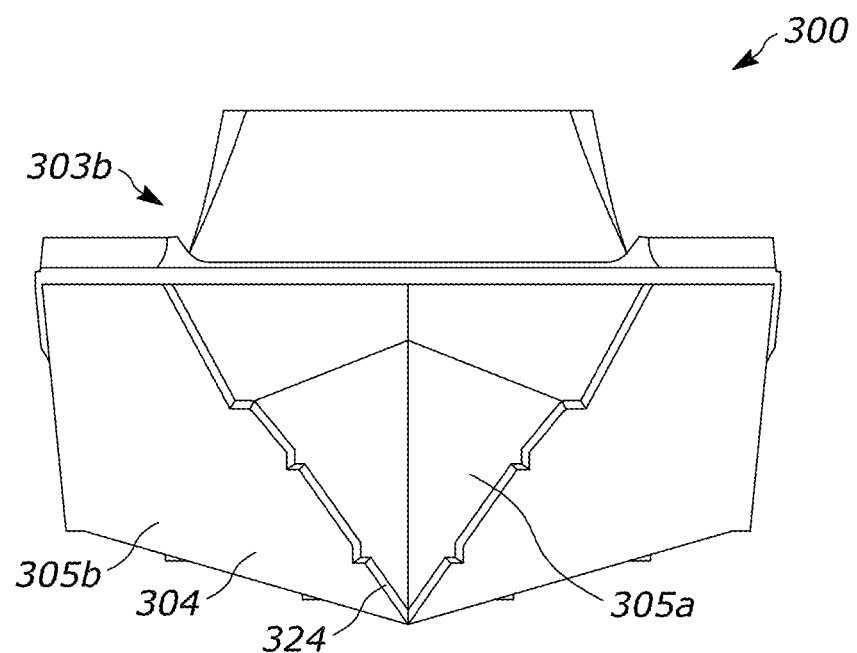
FIG. 3F is a partial front view of the maritime vehicle of FIG. 3D.

FIGS. 3D-3F illustrate another example of a crumple zone 303b that can be used instead of or in addition to the crumple zone 303. The crumple zone 303b is formed by a discontinuity 324 formed in the hull 304. In this example, the discontinuity 324 is formed between the first and second portions 305a, 305b of the hull 304. The discontinuity 324 is a lateral hull segment that causes the aft-most portion of the first portion 305a to be smaller than a foremost portion of the second portion 305b. In the present example, the discontinuity 324 is selectively connected to the first portion 305a. Thus, when the maritime vehicle 300 impacts the target 290, the first portion 305a partially or entirely shears apart from the discontinuity 324 (and the second portion 305b). In some examples, the first portion 305a may telescope fully or partially into the second portion 305b. In other examples, not shown in FIGS. 3D-3F, the crumple zone 303b can include multiple discontinuities 324. Furthermore, in other examples, the first portion 305a can be larger than the second portion 305b and the first portion 305a can telescope such that a portion of first portion 305a surrounds or envelops a portion of the second portion 305b. Additionally, the discontinuity 324 can be defined in a different location of the hull 304 or by another structural member of the maritime vehicle 300. For example, the discontinuity 324 can be part of or defined by one of the bulkheads of the maritime vehicle 300. Additionally, the thickness, material, and angle of the discontinuity 324 can be adjusted to optimize operation of the payload re-positioning system 302 and operation of the maritime vehicle 300 (e.g., to minimize drag). For example, the discontinuity 324 can be formed of a material that has a shear modulus that is lower than the shear modulus of the first material(s) and/or the second material(s).

In other examples, not shown in FIGS. 3A-3F, the maritime vehicle 300 can include an alternative crumple zone that is structurally different but functionally similar to the crumple zones 303, 303b. For example, the first portion 305a can include different structural members (e.g., bulkheads, stringers, ribs, braces) than the second portion 305b. In one example, the first portion 305a can include fewer structural members than the second portion 305b. Additionally or alternatively, the structural members in the first portion 305a can be weaker (e.g., less resilient to bending stress, buckling, tension forces) than the structural members in the second portion 305b. For example, the spacing between ribs in the first portion 305a can be twice as much as the spacing between ribs in the second portion 305b. These and any other differences in the structural support can help facilitate the first portion 305a crumpling while the second portion 305b remains relatively unaffected.

In other examples, not shown in FIGS. 3A-3F, the crumple zone can be formed or defined by forming the hull 304 such that the first portion 305a of the hull 304 is thinner than the second portion 305b of the hull 304. For example, the first portion 305a can be approximately 0.1" inches thick, while the second portion 305b, which is thicker than the first portion 305a, can be between approximately 0.16" or 0.2" thick. As a result, upon impact, the thinner first portion 305a crumples (e.g., bends, deforms) when the maritime vehicle 300 strikes the target 290, yet the thicker second portion 305b is able to withstand the forces generated by the impact between the maritime vehicle 300 and the target 290.

It will be appreciated that the maritime vehicle 300 can include a compressible zone having any number of structural features that reduce the length/volume of the first portion 305a in response to the first portion 305a striking the target 290 with sufficient kinetic energy. For example, the maritime vehicle 300 can include any combination of the crumple zones described herein. For example, the maritime vehicle 300 can include a compressible zone defined by one or more of the above designs, including: the first portion 305a made of a softer material than the second portion 305b, the first portion 305a telescopically receivable in the second portion 305b, the first portion 305a having weaker and/or fewer structural members than the second portion 305b, and the first portion 305a made with a thinner hull material than the second portion 305b.

The payload re-positioning system 302 of the maritime vehicle 300 utilizes the sensor system 214b (shown in FIG. 2), which includes one or more sensors that can detect the compression (e.g., crumpling) of the first portion 305a. For example, the sensor system 214b can include an accelerometer, a strain gauge, and/or other sensors capable of detecting when the first portion 305a crumples, folds, telescopes, or otherwise deforms in response to direct contact with the target 290. In some examples, the sensor system 214b can include an electrical circuit that is completed upon direct contact with the target 290 or deformation of the first portion 305a responsive to that direct contact. For example, the electrical circuit can be completed upon direct contact with a conductive material that forms part or all of the target 290 or part or all of the maritime vehicle 300.

In the present example, responsive to detecting that the crumpling of the first portion 305a has begun, the controller 214a may initiate a timer or fuse for the payload 206 (e.g., bulk charge) that has a pre-determined activation time. For example, the crumpling of the first portion 305a may complete the electrical circuit of the sensor system 214 and initiate the timer or fuse. In one such example, the electrical circuit contacts a conductive hull material (e.g., steel) to complete the circuit. The pre-determined activation time preferably corresponds to the time necessary to crumple the first portion 305a (and move the payload 206 closer to the bow 362) and is preferably between approximately 20 and 50 microseconds. However, in other examples, the predetermined activation time can be greater than 50 microseconds (e.g., 60, 75, 100, or 150 microseconds) or less than 20 microseconds (e.g., 10, 3, 0.5 microseconds). Additionally, the controller 214a can activate the timer or fuse based on a detected distance to the target 290, a detected velocity of the target 290, and/or the velocity 301 of the maritime vehicle 300.

Figure 4A:
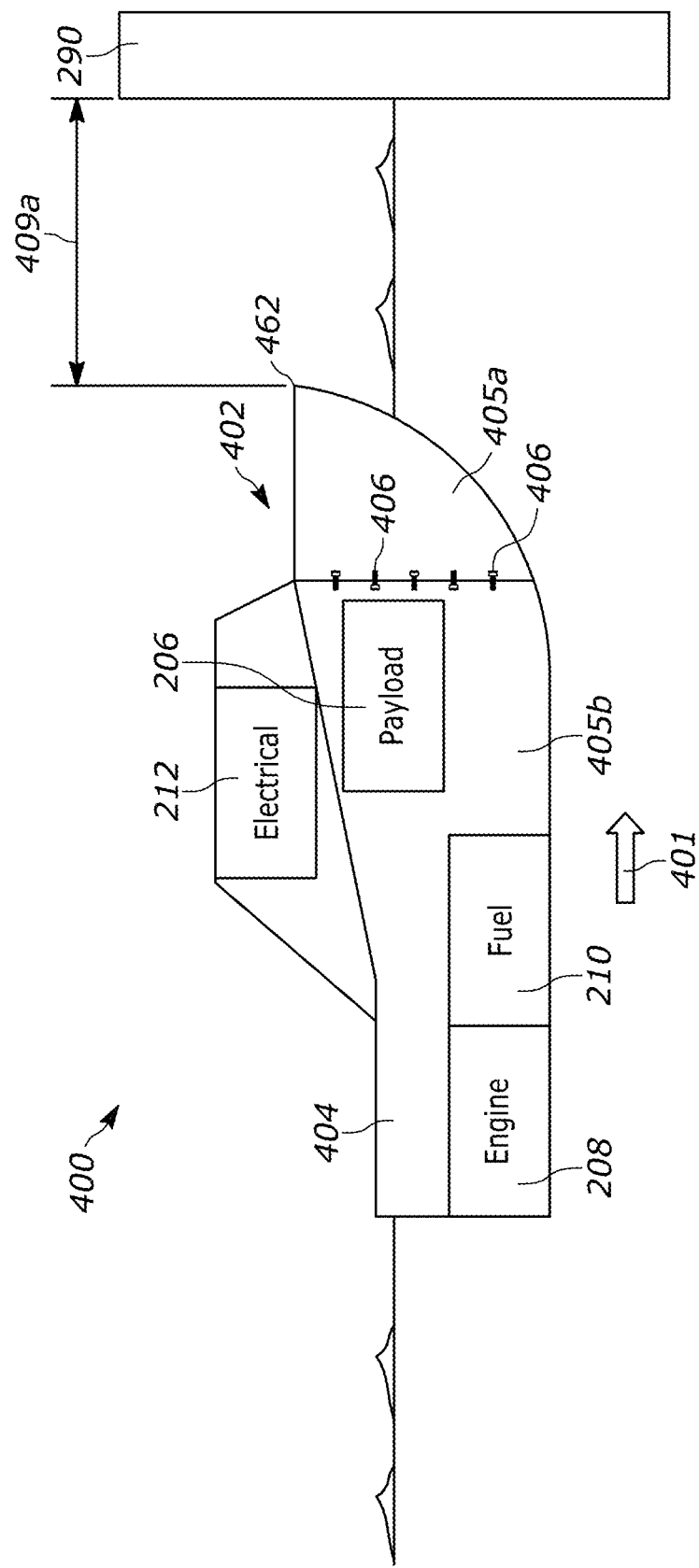
FIG. 4A is a schematic side view of an example maritime vehicle made in accordance with the present disclosure, the maritime vehicle in a patrol mode.
Figure 4B:
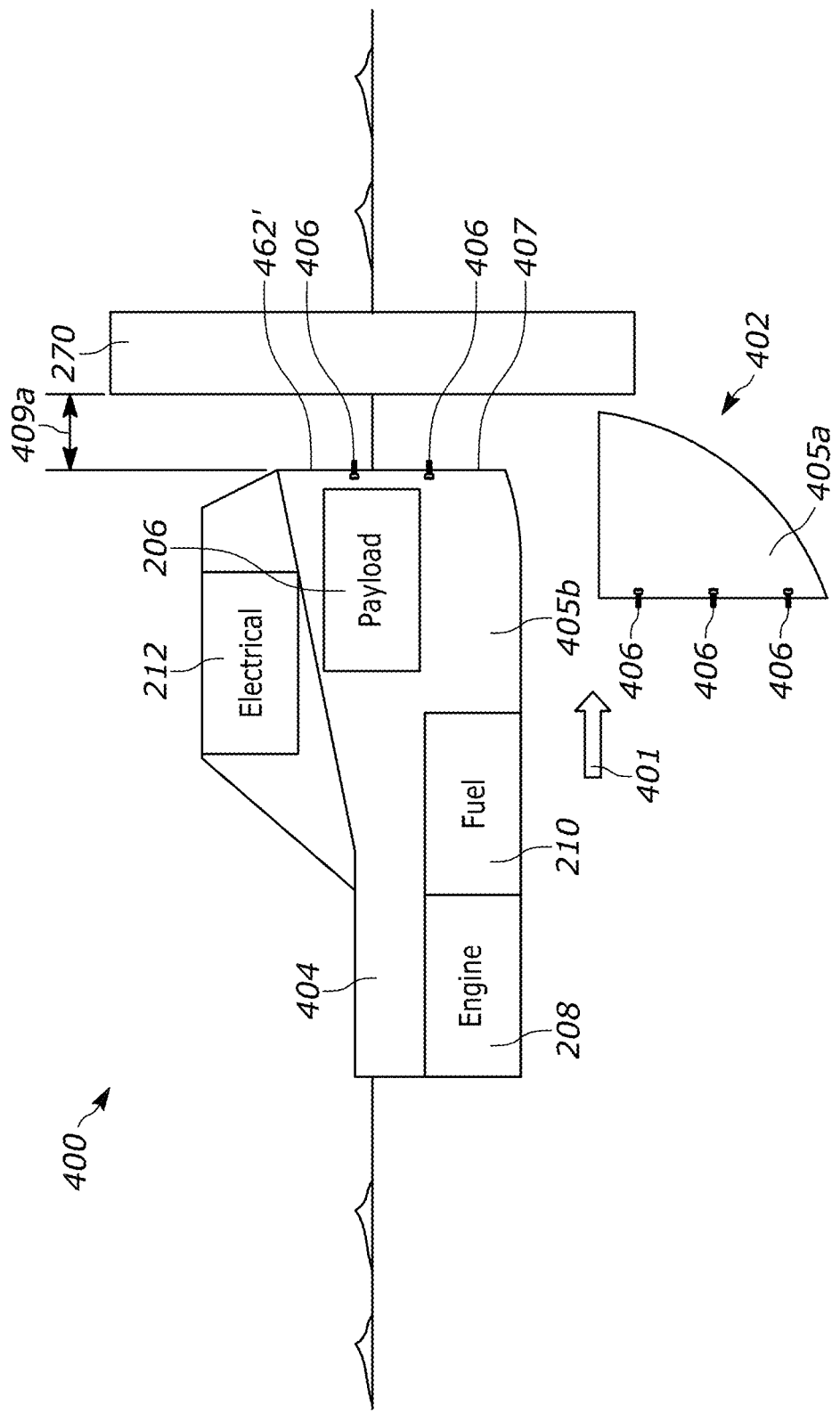
FIG. 4B is similar to FIG. 4A but shows the maritime vehicle transitioning to an engaged mode.

FIGS. 4A-4C illustrate another example of a maritime vehicle 400 having a second example payload re-positioning system 402 constructed in accordance with the teachings of the present disclosure. The maritime vehicle 400 is similar to the maritime vehicle 200, in that the maritime vehicle 400 includes a hull 404 having a first portion 405a and a second portion 405b separated from the first portion 405a by a bulkhead 407, but the payload re-positioning system 402 is different from the payload re-positioning system 302 of the maritime vehicle 300 in the manner described below. The payload re-positioning system 402 is nonetheless configured to optimally position the payload 206 in a similar manner as the payload re-positioning system 302.

The payload re-positioning system 402 generally includes a securement mechanism 403 for removably connecting the first portion 405a to the second portion 405b (and vice-versa). In other words, the first portion 405a is releasably secured to the second portion 405b via the securement mechanism 403. The securement mechanism 403 is reconfigurable between a first state (shown in FIG. 4A) and a second state (shown in FIG. 4B). In the first state, the securement mechanism 403 secures the first portion 405a to the second portion 405b. In the second state, the securement mechanism 403 releases the first portion 405a from the second portion 405b, causing the first portion 405a to detach or separate from the second portion 405b.

In the present example, the securement mechanism 403 includes a plurality of frangible or selectively frangible bolts 406 that removably connect the first portion 405a to the second portion 405b. The bolts 406 are strong enough to withstand the normal stresses of the maritime vehicle 400 when the maritime vehicle 400 operates in a patrol mode (i.e., is in normal operation traversing a body of water). However, the securement mechanism 403 also includes one or more small explosive charges or other mechanisms not shown but positioned immediately adjacent one or more of the bolts 406 to selectively break the bolts 406 when desired (e.g., when the maritime vehicle 400 impacts or is about to impact the target 290). Breaking the frangible bolts 406 causes the securement mechanism 403 to transition from the first state to the second state. As a result, the first portion 405a detaches from the second portion 405b.

Alternatively, the securement mechanism 403 can take the form of one or more actuatable latches removably connecting the first portion 405a to the second portion 405b. Each of the actuatable latches can be actuated between a first state and a second state. In the first state, the actuatable latches securely attach the first portion 405a to the second portion 405b of the hull 404. In the second state, the actuatable latches of the securement mechanism 403 are unlatched, or released, such that the first portion 405a detaches from the second portion 405b of the hull 404. The securement mechanism 403 can include actuators controllable by the controller 214a to selectively actuate the latches between the first and second states, when desired.

The payload re-positioning system 402 utilizes the sensor system 214b to obtain data that can be used to determine when to cause the securement mechanism 403 to transition from the first state to the second state, thereby releasing the first portion 405a from the second portion 405b. Accordingly, the sensor system 214b obtains data regarding the maritime vehicle 400 and the environment surrounding the maritime vehicle 400. The sensor system 214b can, for example, detect a distance between a portion of the maritime vehicle 400 and the target 290. As shown in FIG. 4A, the sensor system 214b can detect a distance 409a between the bow 462 and the target 290, which may be indicative of the fact that the maritime vehicle 400 has directly engaged or is about to directly engage the target 290. As shown in FIG. 4B, the sensor system 212b detects a distance 409b between the target 290 and the modified or new bow 462' after the first portion 405a detaches from the second portion 405b. As discussed in greater detail below, the distance 409b can be used to determine when to detonate the payload 206 when the maritime vehicle 400 impacts the target 290 or is in sufficiently close proximity to the target 290. The sensor system 214b can alternatively or additionally detect other data, e.g., the pressure and/or the temperature of the water in which the maritime vehicle 400 is disposed), the location of the maritime vehicle 400, or accelerometer data indicative of the fact impact between the maritime vehicle 400 and the target 290 has occurred (or is about to occur).

In the present example, the controller 214a utilizes the data generated by the sensor system 214b to determine when to cause the securement mechanism 403 to transition from the first state to the second state. For example, the controller 214a may determine that the maritime vehicle 400 has recently directly engaged or is about to directly engage the target 290 and therefore the securement mechanism 403 should be transitioned from the first state to the second state. In some examples, the controller 214a causes the securement mechanism 403 to transition to the second state so the first portion 405a is released from the second portion 405b, such that the first portion 405a can sink out of the travel path of the maritime vehicle 400 before the maritime vehicle 400 strikes the target 290. In such examples, the controller 214a estimates a time period in which the new bow 462' will impact the target 290 based on the distance 409a and the velocity 401, and releases the first portion 405a with enough time for the first portion 405a to sink out of the travel path of the maritime vehicle 400.

The controller 214a also causes the securement mechanism 403 to transition from the first state to the second state when desired (e.g., when impact between the maritime vehicle 400 and the target 290 has occurred or is about to occur). For example, when the securement mechanism 403 includes the frangible bolts 406, the controller 214a causes the bolts to selectively break (e.g., by activating micro-explosives configured to break the bolts making up the securement mechanism). In other examples, the bolts can be broken or removed via actuators. However, when the securement mechanism 403 includes actuatable latches, the controller 214a controls the detaching of the first portion 405a from the second portion 405b via the actuatable latches. For example, the controller 214a can control actuators that unlatch actuatable latches that secure the first portion 405a to the second portion 405b. After the first portion 405a is detached from the second portion 405b, the bulkhead 407 can form a watertight seal, sealing the second portion 405b and preventing the interior of the second portion 405b from being flooded. In other examples, the bulkhead 407 does not form a watertight seal. As a result, in the engaged mode the bulkhead 407 forms the modified bow 462'. In other examples, the securement mechanism 403 can automatically transition from the first state to the second state in response to the forces created by impact with the target 290.

The controller 214a additionally controls the detonation of the payload 206. The controller 214a, for example, initiates a timer or fuse for the payload 206 that has a predetermined activation time after which the payload 206 will detonate. In the present example, the predetermined activation time can start after the first portion 405a is detached from the maritime vehicle 400. In other examples, the predetermined activation time starts before or at the same time the first portion 405a detaches from the maritime vehicle 400. The predetermined activation time is preferably selected based on the velocity 401 and the distance 409b to detonate the payload at approximately the same time the modified bow 462' makes contact with the target 290 or shortly thereafter. In some examples, the predetermined activation time is between approximately 20 and 50 microseconds. However, in other examples, the predetermined activation time can be several seconds (e.g., 3 seconds, 10 seconds).

Figure 5:
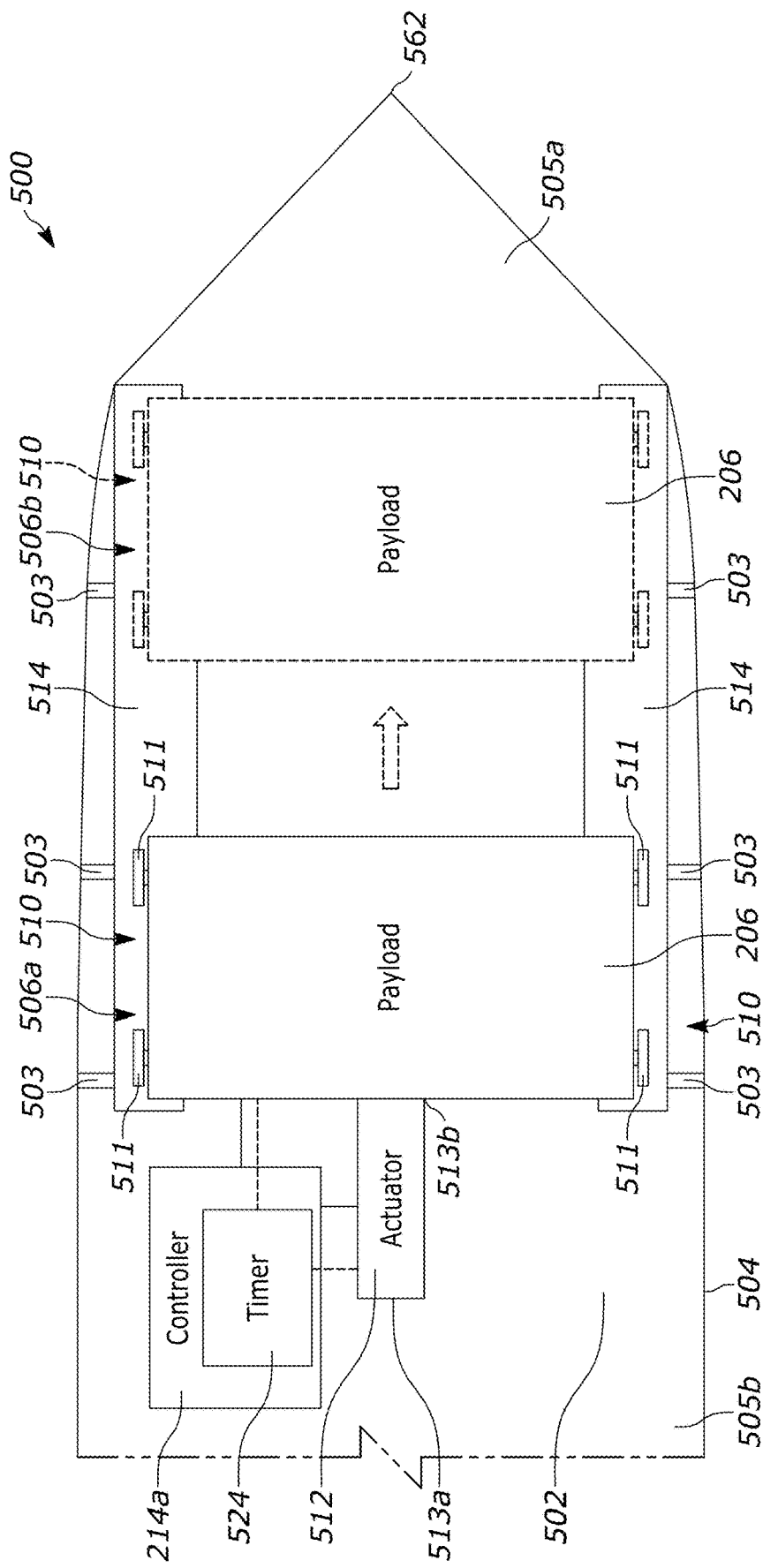
FIG. 5 is a schematic top view of another example of a maritime vehicle made in accordance with the present disclosure, the maritime vehicle having a payload repositioning system made in accordance with the present disclosure.

FIG. 5 illustrates another example maritime vehicle 500 including a third example payload re-positioning system 502 constructed in accordance with the teachings of the present disclosure. The maritime vehicle 500 is similar to the maritime vehicle 200, in that the maritime vehicle 500 includes a hull 504 having a first portion 505a and a second portion 505b, as well as the payload 206 disposed in the hull 504. Additionally, the hull 504 of the maritime vehicle 500 includes stringers 536 like the stringers 136 discussed above in FIGS. 1A-1K and ribs 503 extending perpendicularly (or approximately perpendicularly) to the stringers 536. The payload re-positioning system 502 is, however, different from the payload re-positioning systems 302, 402 in the manner described below. The payload re-positioning system 502 is nonetheless configured to optimally position the payload 206 in a similar manner as the re-positioning systems 302, 402. More particularly, the payload re-positioning system 502 is configured to move payload 206 from a first position 506a within the second portion 505b to a second position 506b, closer to or at least partially within the first portion 505a (e.g., near the bow 562). The payload 206 can be moved from the first position 506a to the second position 506b when the maritime vehicle 500 impacts the target 290 or the maritime vehicle 500 is a pre-determined distance from the target 290. In various examples, either of the example payload re-positioning systems 302, 402 described in connection with FIGS. 3A-3F and 4A-4C is combinable with the payload re-positioning system 502 described in connection with FIG. 5.

As shown in FIG. 5, the payload re-positioning system 502 generally includes an actuator 512 and a translation structure 510 configured to move the payload 206 responsive to the actuator 512. The actuator 512 is generally configured to cause movement of the payload 206, either directly (e.g., by imparting a force on the payload 206) or indirectly via the translation structure 510. Meanwhile, the translation structure 510 disposed on the maritime vehicle 500 facilitates smooth movement of the payload 206 from the first position 506a to the second position 506b. In various examples, the translation structure 510 could be selected for precise movement control, rapid movement, reduced friction, reliability, durability, or any other design consideration or combination of design considerations.

In this example, the actuator 512 is a hydraulic or pneumatic actuator that includes a first end 513a coupled to the maritime vehicle 500 and a second end 513b coupled to the payload 206. When actuated, the actuator 512 exerts a force from the second end 513b and pushes the payload 206. In other examples, the actuator 512 can be an electric actuator, a motor (e.g., an electric motor), or the like.

As shown in FIG. 5, the translation structure 510 in this example takes the form of wheels 511 that are coupled to the payload 206 and are configured to move along the structural stringers 536, which in this example extend from the second portion 505b to the first portion 505a. Thus, the wheels 511 of the payload 206 allow the payload 206 to be moved along the length of the stringers 536 between the first position 506a and the second position 506b. In some examples, the stringers 536 further include rails integrally formed with or otherwise coupled to the stringers 536. For example, the rails could be Tee-rails, Bessemer rails, U Rails, or utilize other rail configurations. In such examples, the wheels 511 are configured to engage the corresponding shape of the rails. In yet other examples, the translation structure 510 can include a rack coupled to each of the stringers 536 and corresponding pinions for the racks coupled to the payload 206. The actuator 512 imparts a force on the payload 206 such that the wheels 511 roll along the stringers 536. In other examples, the actuator 512 is an electric motor that acts on the wheels 511 and causes the wheels 511 to roll.

In other examples, the translation structure 510 includes movable rails and the payload 206 can be disposed on the movable rails and thus moved between the first position 506a and the second position 506b using the rails. The rails can be separate from the stringers 536 or movably coupled to (e.g., seated on) the stringers 536. Additionally, the movable rails can be moved in tracks disposed on or coupled to the stringers 536. In some examples, the movable rails and tracks are sized to nest with one another. Additionally, one or both of the movable rails and the track are made or coated with a low-friction material (e.g., stainless steel, nylon, (PTFE), (PEEK)) or lubricated to reduce friction between the movable rails and tracks. The actuator 512 can impart a force on the payload 206 and/or the movable rails. In other examples, the actuator includes a motor and tether arrangement that pulls the payload 206 from the first position 506a to the second position 506b.

In yet other examples, not shown, the translation structure 510 can take the form of a conveyor system that moves the payload 206. The conveyor system can include a conveyor belt, chain conveyor, inverted monorail, or any other conveyor structure capable of moving the payload 206. For example, if the translation structure 510 is a conveyor belt, the actuator 512 can be an electric motor that causes the belt to move the payload 206 from the first position 506a to the second position 506b.

In yet another example, the payload re-positioning system 502 need not include the actuator 512. Instead of moving the payload 206 via the actuator 512, the payload 206 can move within the hull via the translation structure 510 in response to impact with the target 290. The payload 206 has momentum when the maritime vehicle 500 is moving. Thus, when the maritime vehicle 500 rapidly decelerates (e.g., due to impact with the target 290), the momentum of the payload 206 causes the payload 206 to move within the hull 504 via the translation structure 510.

As shown in FIG. 5, the translation structure 510 moves the payload 206 forward, towards the bow 562 of the maritime vehicle 500. In other examples, the translation structure 510 moves the payload 206 in another direction. For example, the translation structure 510 could move the payload 206 rearward toward the stern, or laterally toward the port or starboard of the maritime vehicle 500. Additionally or alternatively, the translation structure 510 could move the payload 206 up or down from its initial position.

Additionally, as shown in FIG. 5, the maritime vehicle 500 includes the controller 214a and a timer 524 for detonating the payload 206. As shown in FIG. 5, the controller 214a is in wireless or wired communication with the payload 206 and the actuator 512. In turn, the controller 214a may send control signals to activate the actuator 512, activate the translation structure 510, and/or activate the payload 206. For example, similar to the payload re-positioning system 402, the controller 214a may activate the actuator 512 when the maritime vehicle 500 is within a predetermined distance from a target (e.g., target 290). Additionally, the controller 214a can utilize the timer 524 to delay the activation of the payload 206 for a predetermined period of time after activating the actuator 512. The timer 524 can be configured such that the payload 206 detonates in close proximity or upon physical contact with the target (e.g., the target 290). Activating the payload 206 may include controlling any aspect of a modern explosive (e.g., initiator, detonator, main charge). In various examples, the timer 524 may be in direct electronic communication with the payload 206 and/or the actuator 512.

In some examples, the payload re-positioning systems 302, 402, 502 can be combined for increased efficacy. For example, the payload re-positioning system 502 can be combined with the payload re-positioning systems 302 and/or 402. In one such example, the maritime vehicle includes a crumple zone and, upon impact, the payload moves forward toward the bow on its own momentum. Furthermore, in other examples, a portion of the maritime vehicle may separate from the rest of the maritime vehicle while another portion of the maritime vehicle includes a crumple zone configured to crumple in response to impacting a target, and the payload can be movable within the hull (with or without an actuator).

The payload re-positioning systems 302, 402, 502 described herein provide several benefits. The payload re-positioning systems 302, 402, 502 provide precise control over the location and activation of the payload 206 such that the payload 206, which may be a military explosive charge, can be activated proximate the portion of the hull 204, 304, 404, 504 of the maritime vehicle 200, 300, 400, 500 that will maximize the effectiveness of the payload 206.

First, the payload re-positioning system 302, 402, 502 ensures that the payload 206 is disposed near the impact zone (e.g., the bow 262, 362, 462, 562) of the maritime vehicle 200, 300, 400, 500. The close proximity of the payload 206 relative to the impact zone (e.g., the bow 262, 362, 462, 562) increases the effectiveness of the explosive charge in directing the energy of the explosive energy of the payload 206. As a result, the payload re-positioning system 302, 402, 502 provides increased efficacy to a bulk charge (explosive).

Second, the payload re-positioning system 302 places the payload 206 near a collapsed, crumpled first portion 305a. As a result, the payload 206 may be able to generate an explosive charge that causes the first portion 305a to undergo fragmentation to further increase the effectiveness of the payload 206.

Third, because the payload re-positioning system 402 facilitates detachment of the first portion 405a from the maritime vehicle 400, the payload 206 is placed into close proximity or direct contact with an intended target (e.g., target 290). The payload re-positioning system 402 increases the effectiveness of the payload 206 because the close proximity between the payload 206 and the target 290 increases the amount of energy conveyed to the target 290.

Fourth, as discussed above, the actuator 512 facilitates movement of the payload 206 from the first position 506a (sometimes disposed in the second portion 505b of the maritime vehicle 500) to the second position 506b (sometimes disposed in the first portion 505a). Controlling the location of the payload 206 can improve the effectiveness of the payload 206 and can improve the operation of the maritime vehicle 500 (e.g., by changing the buoyancy, maneuverability of the maritime vehicle 500) by positioning the payload in an optimized position within the hull 504 of the maritime vehicle 500.

Those skilled in the art will recognize that a wide variety of modifications, alterations, and combinations can be made with respect to the above described examples without departing from the spirit and scope of the invention(s) disclosed herein, and that such modifications, alterations, and combinations are to be viewed as being within the ambit of the inventive concept(s).

The invention claimed is:

1. A maritime vehicle, comprising:
a hull having a bow and a stern;
a payload disposed within the hull at a first position in which the payload is disposed at a first distance from a front of the bow; and
means for causing the payload to be disposed at a second position in which the payload is disposed at a second distance from the front of the bow when the hull directly contacts or is within a pre-determined distance of a target external to the maritime vehicle, the second distance being less than the first distance.

2. The maritime vehicle of claim 1, wherein the means for causing the payload to be disposed at the second position comprises a compressible zone forming at least part of the bow, the compressible zone configured to reduce an initial length of the bow to a reduced length when the hull directly contacts the target.

3. The maritime vehicle of claim 2, wherein the compressible zone is a crumple zone formed by one or more discontinuities formed in the hull.

4. The maritime vehicle of claim 1, wherein the means for causing the payload to be disposed at the second position comprises:
a securement mechanism having a first state and a second state, wherein the securement mechanism couples a first portion of the hull to a second portion of the hull when the securement mechanism is in the first state and releases the first portion from the second portion when the securement mechanism is in the second state; and
a controller communicatively connected to the securement mechanism;
wherein the payload is disposed at the first position when the securement mechanism is in the first state, and wherein, when the hull directly contacts or is within the pre-determined distance of the target, the controller causes the securement mechanism to transition from the first state to the second state, thereby causing the payload to be disposed at the second position.

5. The maritime vehicle of claim 4, wherein the securement mechanism includes a frangible bolt.

6. The maritime vehicle of claim 4, further comprising a sensor system carried by the hull, wherein the controller causes the securement mechanism to transition to the second state in response to the sensor system detecting that the hull is within the pre-determined distance from the target.

7. The maritime vehicle of claim 1, wherein the means for causing the payload to be disposed at the second position comprises:
a translation structure coupled to the payload and configured to move the payload from the first position to the second position; and
a controller communicatively connected to the translation structure,
wherein the controller causes the translation structure to move the payload from the first position to the second position.

8. The maritime vehicle of claim 7, wherein the translation structure includes at least one of a movable rail at least partially extending between the stern and the bow, one or more wheels for the payload, and a conveyor belt that moves the payload from the first position to the second position.

9. A maritime vehicle, comprising:
a hull having a first portion and a second portion; and
a payload disposed within the second portion;
the first portion including an impact zone and a compressible zone, the impact zone configured to directly contact a target external to the maritime vehicle, and the compressible zone arranged to reduce an initial length of the first portion to a reduced length in response to the impact zone directly contacting the target, thereby reducing a distance between the payload and the impact zone of the hull.

10. The maritime vehicle of claim 9, further comprising a timer for causing detonation of the payload and a controller communicatively connected to the timer, wherein the controller activates the timer after the impact zone directly contacts the target.

11. The maritime vehicle of claim 9, wherein the hull has a bow, a stern, and a mid-portion connecting the bow and the stern, wherein the first portion of the hull includes the bow of the maritime vehicle, wherein the second portion of the hull includes the stern and the mid-portion, and wherein the impact zone is disposed at a front of the bow.

12. The maritime vehicle of claim 9, wherein the first portion is made of a first material having a first shear modulus value and the second portion is made of a second material having a second shear modulus value, the first shear modulus value being lower than the second shear modulus value.

13. The maritime vehicle of claim 9, wherein the compressible zone at least partially telescopes into the second portion when the impact zone directly contacts the target.

14. The maritime vehicle of claim 13, wherein the compressible zone is a crumple zone formed by one or more discontinuities formed in the hull.

15. The maritime vehicle of claim 14, wherein the one or more discontinuities are formed between the first and second portions of the hull.

16. A maritime vehicle, comprising:
a hull having a first portion and a second portion;
a payload disposed within the second portion;
a securement mechanism having a first state and a second state, wherein the securement mechanism couples the first portion to the second portion when the securement mechanism is in the first state and releases the first portion from the second portion when the securement mechanism is in the second state; and
a controller communicatively connected to the securement mechanism, wherein, when the hull directly contacts or is located within a pre-determined distance of a target external to the maritime vehicle, the controller causes the securement mechanism to transition from the first state to the second state.

17. The maritime vehicle of claim 16, wherein the securement mechanism includes a frangible bolt.

18. The maritime vehicle of claim 16, further comprising a bulkhead disposed between the first portion and the second portion, wherein the bulkhead forms a watertight seal for the second portion when the first portion is released from the second portion.

19. The maritime vehicle of claim 16, further comprising a sensor system carried by the hull, wherein the controller causes the securement mechanism to transition to the second state in response to the sensor system detecting that the hull is located within the pre-determined distance of the target.

20. The maritime vehicle of claim 16, further comprising a timer communicatively connected to the controller, the timer configured to cause a detonation of the payload after a pre-determined period of time, wherein the controller activates the timer when the hull directly contacts or is located within the pre-determined distance of the target.

21. A maritime vehicle, comprising:
a hull having a first portion and a second portion;
a payload movably disposed in the second portion;
an actuator coupled to the payload; and
a controller communicatively connected to the actuator, wherein the controller causes the actuator to move the payload from a first position, in which the payload is in the second portion and is spaced a first distance from the first portion, to a second position, in which the payload is at least partially disposed in the first portion or is spaced a second distance from the first portion that is less than the first distance, and wherein the controller further causes the payload to detonate when the payload is in the second position.

22. The maritime vehicle of claim 21, further comprising a timer for causing detonation of the payload after a pre-determined period of time, wherein the controller activates the timer when the payload reaches the second position or is moved from the first position to the second position.

23. The maritime vehicle of claim 21, further including a translation structure coupled to the payload and configured to move the payload from the first position to the second position;
wherein the actuator causes the translation structure to move the payload from the second portion to the first portion.

24. The maritime vehicle of claim 23, wherein the translation structure includes a movable rail extending between the second portion and the first portion.

25. The maritime vehicle of claim 23, wherein the translation structure includes one or more wheels for the payload configured to move along one or more stringers of the maritime vehicle.

26. The maritime vehicle of claim 23, wherein the translation structure includes a conveyor belt that moves the payload from the second portion to the first portion.

* * * * *